United States Patent [19]

Struger et al.

[11] 4,266,281

[45] May 5, 1981

[54] MICROPROGRAMMED PROGRAMMABLE CONTROLLER

[75] Inventors: Odo J. Struger, Chagrin Falls; Ernst H. Dummermuth, Chesterland, both of Ohio

[73] Assignee: Allen-Bradley Company, Milwaukee, Wis.

[21] Appl. No.: 26,012

[22] Filed: Apr. 2, 1979

[51] Int. Cl.³ .................... G06F 9/22; G06F 13/00; G05B 11/01
[52] U.S. Cl. .................................. 364/900; 364/104
[58] Field of Search ... 364/900 MS File, 200 MS File, 364/104, 107

[56] References Cited

U.S. PATENT DOCUMENTS

| | | | |
|---|---|---|---|
| 3,806,877 | 4/1974 | Kiffmeyer et al. | 364/900 |
| 3,942,158 | 3/1976 | Dummermuth | 364/900 |
| 4,038,533 | 7/1977 | Dummermuth et al. | 364/900 X |
| 4,078,259 | 3/1978 | Soulsby et al. | 364/900 |
| 4,107,785 | 8/1978 | Seipp | 364/900 |
| 4,118,792 | 10/1978 | Struger et al. | 364/900 |
| 4,142,246 | 2/1979 | Fumihiko et al. | 364/900 |
| 4,178,634 | 12/1979 | Bartlett | 364/900 |

*Primary Examiner*—Melvin B. Chapnick
*Attorney, Agent, or Firm*—Quarles & Brady

[57] ABSTRACT

A programmable controller includes a processor formed around a pair of four-bit bipolar microprocessors. A control program formed by selected macroinstructions is stored in a random access memory and it is executed by sequentially mapping each macroinstruction operation code into a corresponding microroutine which is stored in a read-only memory. Some macroinstructions include operand addresses of a line in an I/O image and data table portion of the random access memory, and one macroinstruction (ADX) expands this operand address to enable the I/O image and data table to be expanded in size. A timer macroinstruction is executed in part by reading the state of a counter which is driven by a real time clock, and arithmetic functions are performed with the use of a decimal adjust accumulator.

14 Claims, 12 Drawing Figures

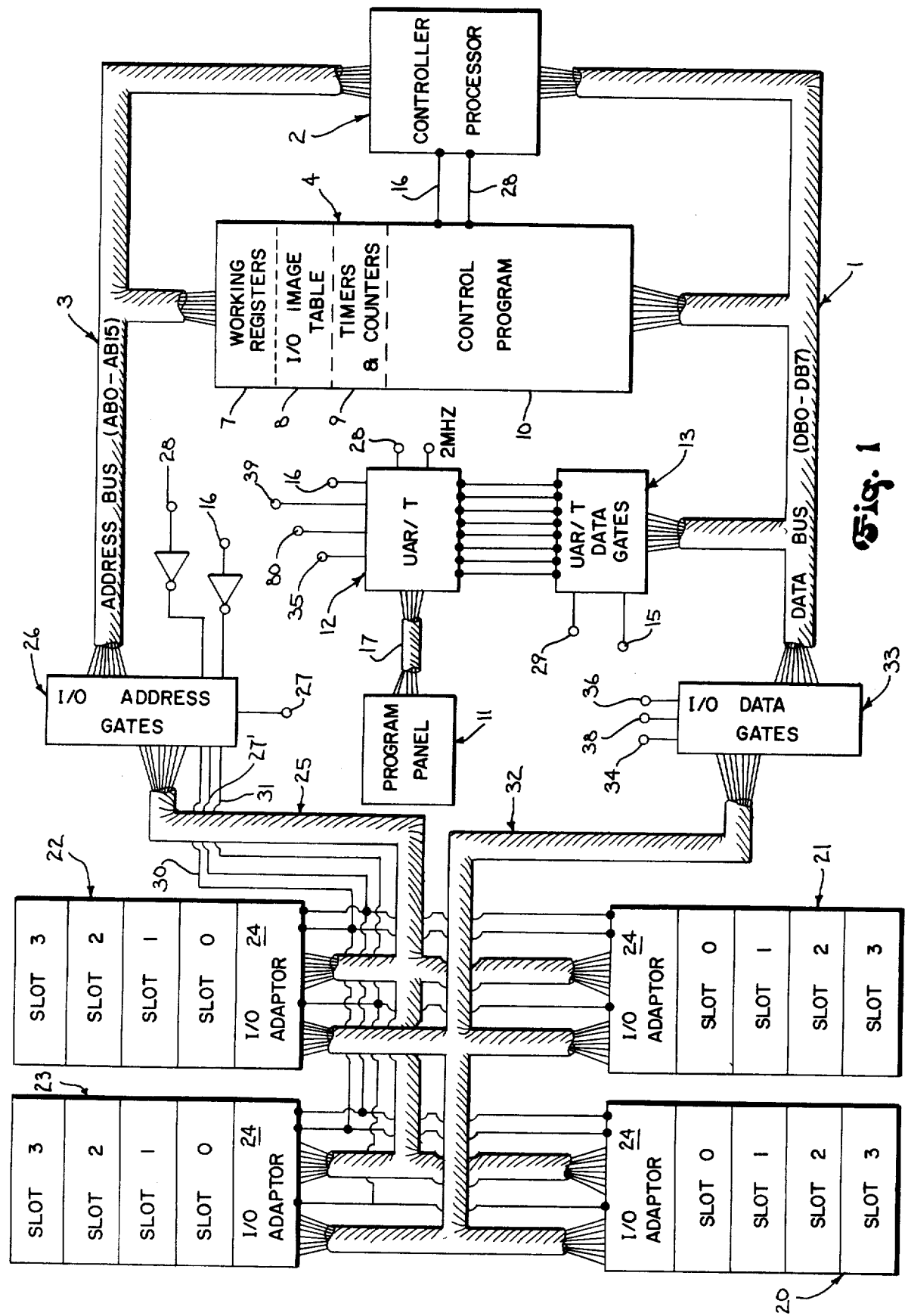

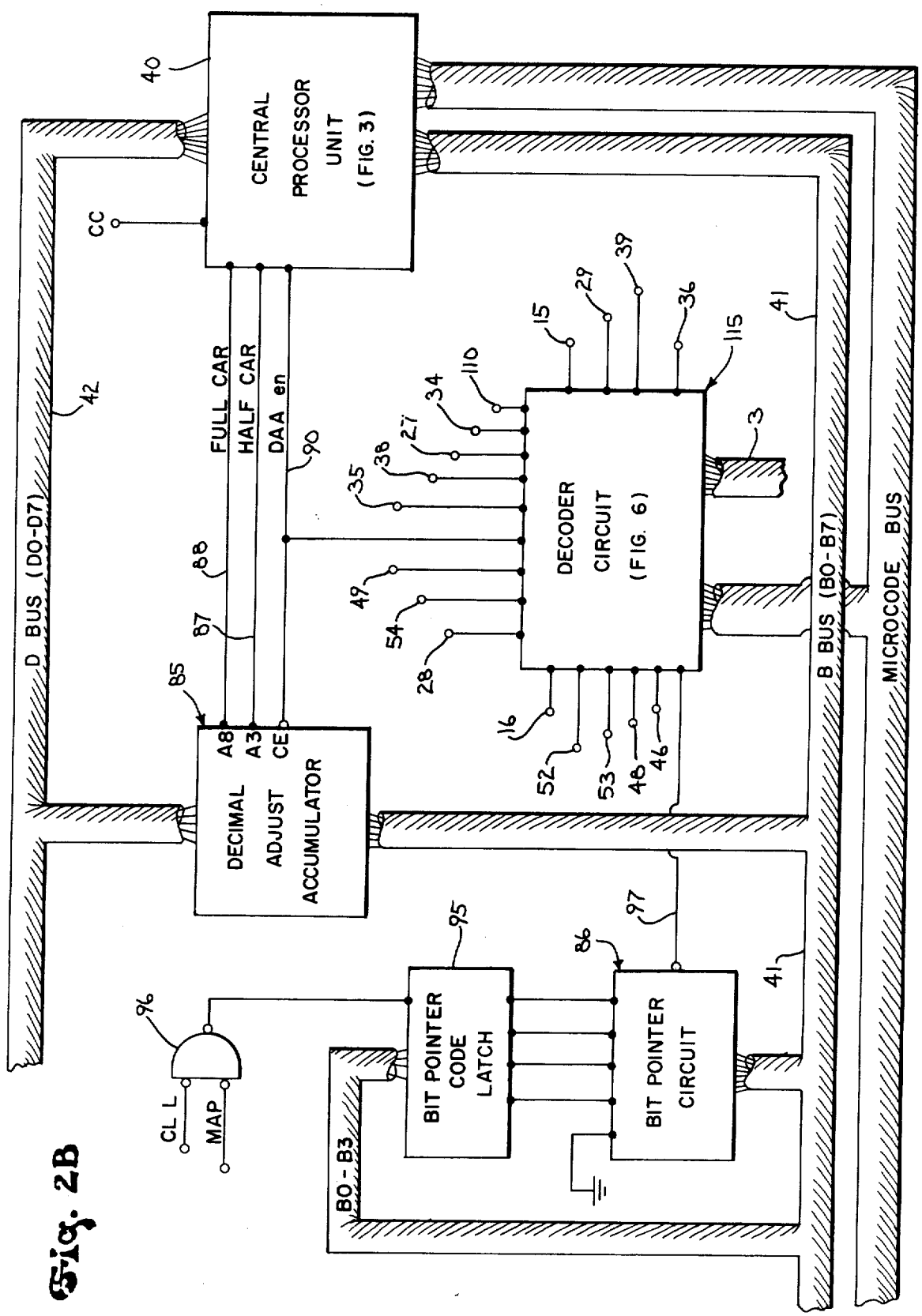

Fig. 5A — REGISTER TO REGISTER MICRO FIELD ASSIGNMENT

| Bit No. | Field |
|---|---|
| 28–31 | SOURCE REGISTER A |
| 24–27 | SOURCE REGISTER B |
| 22–23 | EXTERNAL DESTINATION CODE |
| 20–21 | EXTERNAL DATA SOURCE CODE |
| 19 | DATA OUT CONTROL BIT |
| 16–18 | MICROPROCESSOR DESTINATION CONTROL BITS |
| 14–15 | CARRY IN & CARRY PROPAGATE BITS |
| 8–13 | CONTROL OF LOGIC & ARITHMETIC FUNCTIONS |
| 6–7 | READ, WRITE & IMM CONTROL |
| 4–5 | MICRO CLOCK |
| 0–3 | MICROPROGRAM CONTROL CODE |

Fig. 5B — BRANCH MICRO FIELD ASSIGNMENT

| Bit No. | Field |
|---|---|
| 20–31 | TARGET ADDRESS |
| 10–19 | DON'T CARE |
| 8–9 | STATUS BIT SELECT CODE |
| 6–7 | READ, WRITE & IMM |
| 4–5 | MICRO CLOCK |
| 0–3 | MICROPROGRAM CONTROL CODE |

| BIT NO. | 7 | 6 | 5 | 4 | 3 | 2 | 1 | 0 | |
|---|---|---|---|---|---|---|---|---|---|
| HIGH BYTE | TIMING | | TIMED OUT | | MSBCD DIGIT | | | | ACCUMULATED TIME |
| LOW BYTE | MBCD DIGIT | | | | LSBCD DIGIT | | | | |
| HIGH BYTE | 10 msec COUNTER | | | | MSBCD DIGIT | | | | PRESET VALUE |
| LOW BYTE | MBCD DIGIT | | | | LSBCD DIGIT | | | | |

MICROPROGRAMMED PROGRAMMABLE CONTROLLER

BACKGROUND OF THE INVENTION

The field of the invention is programmable controllers such as those disclosed in U.S. Pat. Nos. 3,942,158 and 3,810,118.

Programmable controllers are typically connected to industrial equipment such as assembly lines and machine tools to sequentially operate the equipment in accordance with a stored control program. In programmable controllers such as those disclosed in the above cited patents, for example, the control program is stored in a memory and includes instructions which are read out in rapid sequence to examine the condition of selected sensing devices on the controlled equipment and instructions which energize or deenergize selected operating devices on the controlled equipment contingent upon the status of one or more of the examined sensing devices. The processor in a programmable controller is designed to rapidly execute programmable controller type instructions which call for the manipulation of single-bit input data and the control of single-bit output data.

The length of the control program, and hence the complexity of the system to be controlled, must be limited to insure that the entire control program can be executed, or scanned, within a set time. Such time limits are required to insure that the programmable controller will provide virtually instantaneous response to any change in the status of sensing devices on the controlled system. Therefore, the speed with which a controller processor can execute a programmable controller instructions has a direct bearing on the size of the machine or process which it can effectively control.

Although the vast majority of programmable controllers presently in use are comprised of discrete components, a number of small programmable controllers have been introduced in recent years which employ a mircroprocessor. Heretofore, such microprocessor based programmable controllers have been limited in size by the speed with which the microprocessor can execute programmable controller type expressions, and hence, the speed with which it can scan the control program. To assist the microprocessor in carrying out the numerous single-bit calculations necessary to execute a control program, hardware such as data selectors and addressable latches have been employed to "convert" the word-oriented microprocessor to a single-bit processor. Or, as disclosed in U.S. Pat. No. 4,165,534, hardwired "Boolean processors" have been employed to assist the microprocessor in performing single-bit calculations.

Not only should a programmable controller processor be able to execute Boolean expressions rapidly, but it also should be able to execute programmable controller type instructions. Such instructions have become quite standardized in the industry in terms of the functions they perform. They may be directly associated with elements of a ladder diagram and are, therefore, easily understood by control engineers who use programmable controllers. Program panels such as those disclosed in U.S. Pat. Nos. 3,798,612, 3,813,649 and 4,070,702 have also been developed to assist the user in developing and editing a control program comprised of programmable controller type instructions. Such program panels account to a great extent for the rapidly increasing popularity of programmable controllers and any new controller processor should be compatible with them. In other words, the controller processor should be capable of directly executing programmable controller type instructions.

SUMMARY OF THE INVENTION

The present invention relates to a programmable controller which employs a microprogrammed processor and special purpose hardware to execute programmable controller type macroinstructions. One of such macroinstructions (ADX) operates the system to expand the addressing capability of the macroinstructions in the control program and other macroinstructions (TON.01, TOF.01) enable the system to operate as a ten millisecond timer. Other aspects of the invention are a decimal adjust accumulator which assists the microprogrammed processor is performing binary coded decimal arithmetic functions and a bit pointer circuit which assists it in performing bit manipulations.

A general object of the invention is to provide a microprocessor based controller which will rapidly execute programmable controller type instructions. The decimal adjust accumulator speeds up the execution of arithmetic functions and the bit pointer circuit speeds up the execution of single-bit oriented instructions. Bipolar microprocessor slices are employed for fast microinstruction execution.

Another object of the invention is to provide a programmable controller which will execute timer instructions that measure time increments shorter than the control program scan time. A real time clock circuit is coupled to the processor and it includes a multi-bit counter which counts time increments. The contents of this counter are examined during the execution of each timer instruction and its present value is compared to its previous value to determine the number of time increments which have occurred since the timer instruction was last executed.

Yet another object of the invention is to provide a programmable controller which will accommodate a large I/O image and data table that is addressable by programmable controller instructions. This is accomplished by the use of a special address expansion macroinstruction (ADX) which may be inserted just prior to any controller instruction that is to address a memory location outside the range of its own address code. A selected microprogram is executed when the address expansion macroinstruction (ADX) is read from the control program memory and this microprogram presets the most significant address bus leads in the programmable controller to a value which brings the desired memory location within the range of the address code in the programmable controller instruction that follows. The practical result of this invention is that the I/O image table, data table and timers and counters which are stored in the controller memory can be expanded in size far beyond that possible in prior programmable controllers.

The foregoing and other objects and advantages of the invention will appear from the following description. In the description reference is made to the accompanying drawings which form a part hereof, and in which there is shown by way of illustration a preferred embodiment of the invention. Such embodiment does not necessarily represent the full scope of the invention, however, and reference is therefore made to the claims herein for interpreting the scope of the invention.

BRIEF DESCRIPTION OF THE DRAWINGS

FIG. 1 is an electrical block diagram of a programmable controller which employs the present invention, FIGS. 2A and 2B are an electrical block diagram of the controller processor which forms part of the controller of FIG. 1.

DESCRIPTION OF THE PREFERRED EMBODIMENT

Figure 2A:
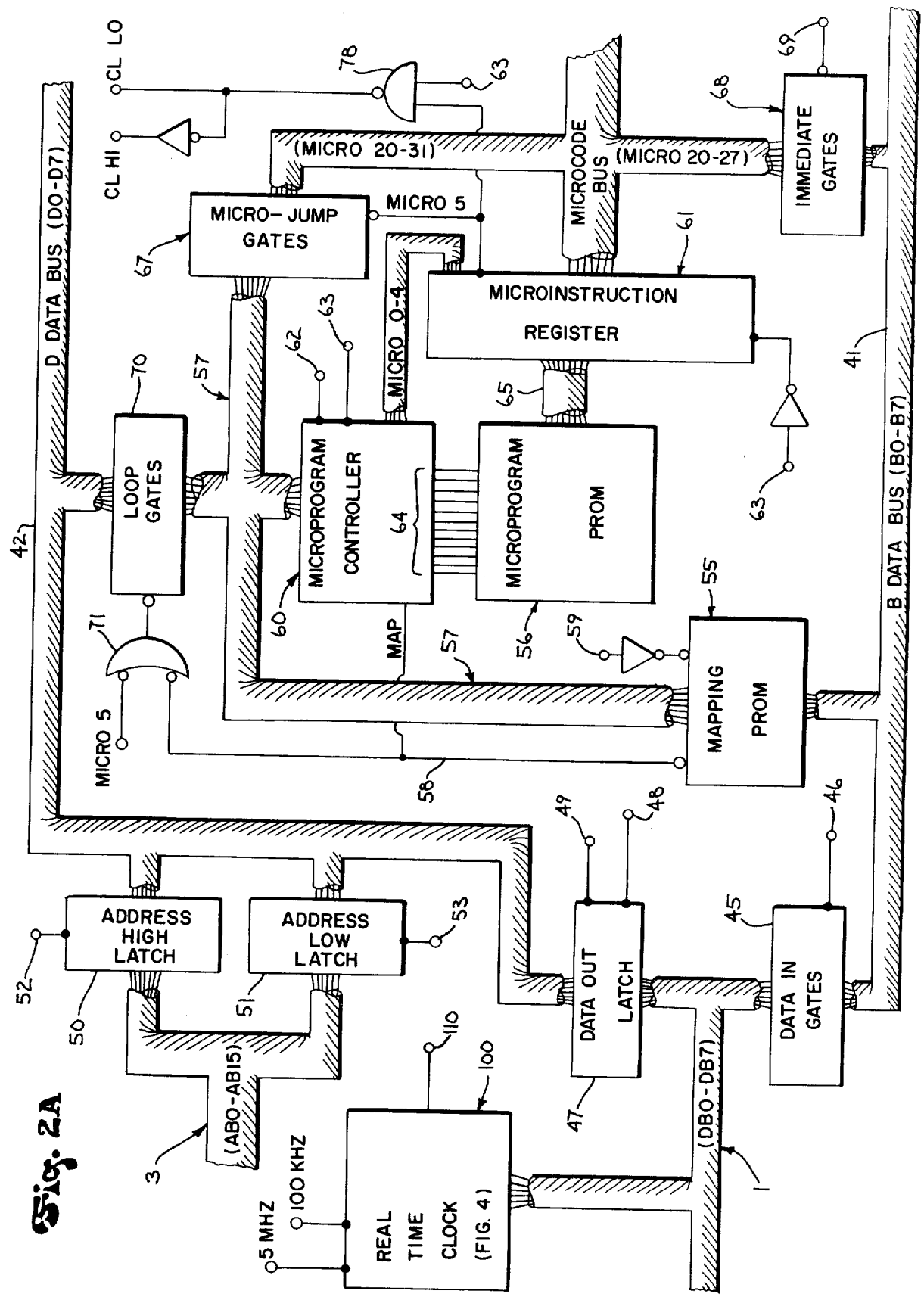

Referring to FIG. 1, the programmable controller is structured around an eight-bit bidirectional data bus 1 and includes a controller processor 2 which directs the flow of data thereon by means of control lines and a sixteen-bit address bus 3. A random access memory (RAM) 4 connects to both the data bus 1 and the address bus 3 and an eight-bit data word may be written into an addressed line or read out of an addressed line of the memory 4 in response to control signals applied to a WRITE control line 28 and a READ control line 16. The RAM 4 may include anywhere from 1 K to 16 K lines of memory depending on the size of the control program to be stored. The first 96 to 512 lines consist of working registers 7, an I/O image table 8 and a timers and counters storage 9, although, as will be described hereinafter, this can be expanded by using the ADX macroinstruction of the present invention. The remainder of the RAM 4 stores the control program 10 which is comprised of a large number of programmable controller type instructions.

The control program 10 is loaded into the memory 4 and edited by means of a program panel 11 which couples to the data bus 1 through a universal asynchronous receiver/transmitter (UAR/T) 12 and two sets of data gates which are indicated collectively at 13. When data is received from the program panel 11 serially through a cable 17 an interrupt request is generated on an INT REQ line 80. The controller processor executes an interrupt service microroutine in response to this interrupt request and the received eight-bit word is gated onto the data bus 1. The UAR/T 12 is enabled through a control line 39 and a DBIN control line 35. A byte of data is written into the UAR/T 12 when a WRITE control line 28 is at a logic low voltage and a byte of data is read from the UAR/T 12 when the READ line 16 is low. Data is gated from the data bus 1 to the UAR/T 12 when a logic high voltage is applied to the UAR/T data gates 13 through a control line 15 and data is coupled to the data bus 1 from the UAR/T 12 when the gates 13 are enabled through a control line 29.

The programmable controller is connected to the machine, or system being controlled, through I/O interface racks 20–23. Each interface rack 20–23 includes an I/O adapter card 24 and up to sixteen four-bit input or output cards (not shown in the drawings) that are received in eight slots 0–7. That is, each slot 0–7 may include two four-bit I/O modules, or cards. Each input card contains four input circuits for receiving digital signals that indicate the status of sensing devices such as limit switches on the machine being controlled, and each output card contains four output circuits for controlling operating devices on the machine such as motor starters and solenoids. Input and output circuits such as those disclosed in respective U.S. Pat. Nos. 3,643,115 and 3,745,546 may be employed for this purpose although numerous circuits are available to interface with the many types of sensing devices and operating devices which may be encountered in industrial applications.

Data is coupled to or from a particular card in one of the I/O interface racks 20–24 by addressing it through a five-bit I/O address bus 25. Two bits select the appropriate I/O interface rack 20–23 and the remaining three bits identify the slot being addressed. The I/O adapter card 24 on each I/O interface rack 20–23 includes means for recognizing when its rack is being addressed (not shown in the drawings) for enabling the appropriate slot and card. Reference is made to U.S. Pat. No. 4,118,792 which issued on Oct. 3, 1978 and which is entitled "Malfunction Detection System for a Microprocessor Based Programmable Controller," for a more detailed description of the I/O adapter cards 24.

As will be explained in detail hereinafter, the I/O address is generated on the address bus 3 (AB0-AB4) by the controller processor 2. It is coupled to the I/O address bus 25 by a set of I/O address gates 26 which are enabled when a logic high voltage is generated on an "I/O RDWR" control line 27. In addition to the I/O address, the gates 26 couple the WRITE control line 28 and READ control line 16 to each of the interface racks 20–23 through an I/O read line 30 and an I/O write line 31. A strobe line 27' also connects to each rack 20–23 to indicate when an input or output function is to be performed.

Data is coupled between the controller processor 2 and the I/O interface racks 20–23 through an eight-bit I/O data bus 32 and a set of eight I/O data gates 33. When a logic high voltage is generated on the I/O read line 30, eight bits of data are gated onto the I/O data bus 32 by the addressed I/O card and this byte of data is coupled to the data bus 1 by the I/O data gates 33. Conversely, when a logic high is generated on the I/O write control line 31, an eight-bit output data word is coupled from the controller processor 2, through the I/O data gates 33 and to an addressed output card in one of the I/O interface racks 20–23. The I/O data gates 33 are controlled by a "BE" control line 34 which is driven to a logic high voltage when data is to be outputted to the I/O interface racks 20–23, and the I/O RDWR control line 38 which is driven low to enable the gates 33. A 5 mHz "OSC" control line 36 synchronizes the operation of the I/O data gates 33 with that of the controller processor 2.

As will be explained in more detail hereinafter, the control program stored in the RAM 4 is repeatedly executed, or scanned, by the controller processor 2 when in the "run" mode. Each scan through the control program requires typically from five to twenty milliseconds (the exact time depends on the length of the control program 10 and the types of instructions contained therein) and after each such scan, an I/O scan routine is executed to couple data between the I/O interface racks 20-23 and the I/O image table 8 in the RAM 4. The I/O image table 8 stores an input status data word and an output status data word for each I/O card in the interface racks 20-23. Each data word in the I/O image table 8 is thus associated with a specific card in one of the I/O interface racks 20-23. Each input status word is an image of the state of eight sensing devices connected to its associated I/O card and each output status word is an image of the desired state of any operating devices connected to its associated I/O card. If a particular I/O slot contains an input card, the output status word in the I/O image table 8 which corresponds to that slot is blank or can be used for other purposes.

The I/O scan is made after each scan, or execution, of the control program 10. The I/O scan is a programmed sequence in which output status words are sequentially coupled from the I/O image table 8 to their associated I/O cards and input status words are sequentially coupled from the I/O cards to their associated memory locations in the I/O image table 8. The I/O scan is performed frequently and thus the I/O image table 8 is kept up to date with changing conditions on the machine or process being controlled. As will become apparent from the discussion to follow, the controller processor 2 operates on data in the I/O image table 8 rather than data received directly from the I/O interface racks 20-23. This allows the processor to operate at maximum speed to execute the control program 10 in a minimum amount of time while at the same time minimizing the data rates in the I/O data bus 32 and the I/O address bus 25. The latter consideration is important since lower data rates allow the use of more effective noise immunity circuits which are so necessary in an industrial environment.

The overall function of the programmable controller is governed by the programmable controller type instructions stored in the control program portion 10 of the RAM 4. As will become apparent from the description to follow, these programmable controller type instructions are treated as "macroinstructions" in the invented controller in that each is mapped into a set of microinstructions which are executed by the controller processor 2 to carry out the function indicated by the macroinstruction. Before describing the manner in which the controller elements function to execute the programmable controller type instructions, however, a brief discussion of the programmable controller instruction set is in order. The macroinstruction set includes all of the controller instructions described in the above cited U.S. Pat. No. 3,942,158 entitled "Programmable Logic Controller" which includes three general types: bit instructions; word instructions; and control instructions. Bit instructions and word instructions are stored on two memory lines, the first line storing an operand address and the second line storing an operation code. The control instructions are comprised solely of a two-line operation code. The bit instructions include the following:

TABLE I

| MNE-MONIC | BIT POINTER | | | OPERATION CODE | | | | | EXECUTION TIME |
|---|---|---|---|---|---|---|---|---|---|
| XIC/XOE | X | X | X | 0 | 1 | 0 | 1 | 1 | 3.0 usec. |
| XIO/XOD | X | X | X | 1 | 1 | 0 | 1 | 1 | |
| OTU | X | X | X | 1 | 0 | 1 | 1 | 1 | |
| OTL | X | X | X | 0 | 0 | 1 | 1 | 1 | 4.0 usec. |
| OTE | X | X | X | 0 | 1 | 1 | 1 | 1 | |
| INSTRUCTION BIT NUMBER | 0 | 1 | 2 | 3 | 4 | 5 | 6 | 7 | |

The operations performed by these bit instructions are briefly defined as follows:

XIC—Examine status bit closed or, is the status bit in a logic 1 state?

XOE—Same as XIC, but refers to a status bit in the output image table.

XIO—Examine status bit open or, is the status bit in a logic 0 state?

XOD—Same as XIO, but refers to a status bit in the output image table.

OTU—If conditions are true turn status bit off, or to a logic 0 state, and if false do nothing.

OTL—If conditions are true turn status bit on, or to a logic 1 state, and if false do nothing.

OTE—If conditions are true turn status bit on and if conditions are false turn status bit off.

The 8-bit operand address which is associated with each of the above operation codes identifies the memory address of the word containing the desired status bit whereas the bit pointer associated with the operation code identifies the location of the status bit in the addressed memory word. The operand address typically identifies a line in the I/O image table 8 or the timers and counters portion 9 of the memory 4. Because the range of the 8-bit operand address is only 256 addresses, these portions of the memory 4 have heretofore been limited in size.

The control instructions include the following:

TABLE II

| MNEMONIC | OPERATION CODE | | | | | | | | EXECUTION TIME |
|---|---|---|---|---|---|---|---|---|---|
| NOP | X | 0 | 0 | 0 | 0 | 0 | 0 | 0 | 2.2 usec. |
| BND | 0 | 0 | 0 | 0 | 0 | 0 | 1 | 1 | |
| BST | 0 | 0 | 0 | 1 | 0 | 0 | 1 | 1 | |
| MCR | 0 | 0 | 0 | 1 | 1 | 1 | 0 | 1 | |
| ADX | 0 | 0 | 1 | 0 | 0 | 1 | 1 | 0 | |
| END | 0 | 0 | 1 | 0 | 0 | 1 | 0 | 0 | <1000 usec. |
| INSTRUCTION BIT NUMBER | 0 | 1 | 2 | 3 | 4 | 5 | 6 | 7 | |

Note:
X Signifies "don't care"

The operations performed by these control instructions are briefly defined as follows:

NOP—No operation

BND—Branch end: termination of a Boolean subbranch

BST—Branch start: opens or begins a Boolean subbranch

END—End of the control program

MCR—Master Control register

ADX—Expand the operand address in the macroinstruction which follows.

The word type programmable controller instructions include the following:

TABLE III

| MNEMONIC | OPERATION CODE | | | | | | | | EXECUTION TIME |
| --- | --- | --- | --- | --- | --- | --- | --- | --- | --- |
| TOF .01 sec. | X | 1 | 0 | 0 | 0 | 0 | 0 | 0 | 15 usec. |
| TOF 0.1 sec. | X | 0 | 0 | 1 | 0 | 0 | 0 | 0 | |
| TOF 1.0 sec. | X | 1 | 0 | 1 | 0 | 0 | 0 | 0 | |
| TON .01 sec. | X | 0 | 1 | 0 | 0 | 0 | 0 | 0 | |
| TON 0.1 sec. | X | 1 | 0 | 1 | 0 | 0 | 0 | 0 | |
| TON 1.0 sec. | X | 1 | 1 | 1 | 0 | 0 | 0 | 0 | |
| RTO 0.1 sec. | X | 0 | 0 | 0 | 1 | 0 | 0 | 0 | |
| RTO 1.0 sec. | X | 1 | 0 | 0 | 1 | 0 | 0 | 0 | |
| CTD | X | 1 | 1 | 0 | 1 | 0 | 0 | 0 | 15 usec. |
| CTU | X | 0 | 1 | 0 | 1 | 0 | 0 | 0 | |
| RTR | X | 1 | 0 | 0 | 0 | 1 | 0 | 0 | |
| CTR | X | 0 | 0 | 0 | 0 | 1 | 0 | 0 | |
| PUT | X | 1 | 0 | 1 | 1 | 0 | 0 | 0 | 4.8 |
| GET | X | 0 | 0 | 1 | 1 | 0 | 0 | 0 | 4.4 usec. |
| EQU | X | 0 | 1 | 1 | 1 | 0 | 0 | 0 | 5.6 |
| LES | X | 1 | 1 | 1 | 1 | 0 | 0 | 0 | 5.6 |
| INSTRUCTION BIT NUMBER | 0 | 1 | 2 | 3 | 4 | 5 | 6 | 7 | |

X is not part of operation code, but is an additional operand address bit.

The operations performed by these word-type instructions are briefly defined as follows:

TOF—If conditions are true turn output on, otherwise, wait until time is out then turn output off.

TON—If conditions are true wait until time is out then turn output on, otherwise, turn output off.

RTO—If conditions are true wait until time is out then turn output on, otherwise, stop timer.

CTD—If the conditions are true reduce the count by one.

CTU—If the conditions are true increase the count by one.

PUT—If conditions are true write the number in the microprocessor accumulator in the selected memory line, otherwise, do nothing.

RTR—If the conditions are true reset the timer.

CTR—If the conditions are true reset the counter.

GET—Fetch the word on the selected memory line and store in the microprocessor accumulator.

EQU—Is the value stored in the microprocessor accumulator equal to the value stored on the selected memory line?

LES—Is the value stored in the microprocessor accumulator less than the value stored on the selected memory line?

The operand address which is associated with each of these word-type operation codes is a lower eight-bit byte of a 16-bit address of a line in the RAM 4.

Figure 3:
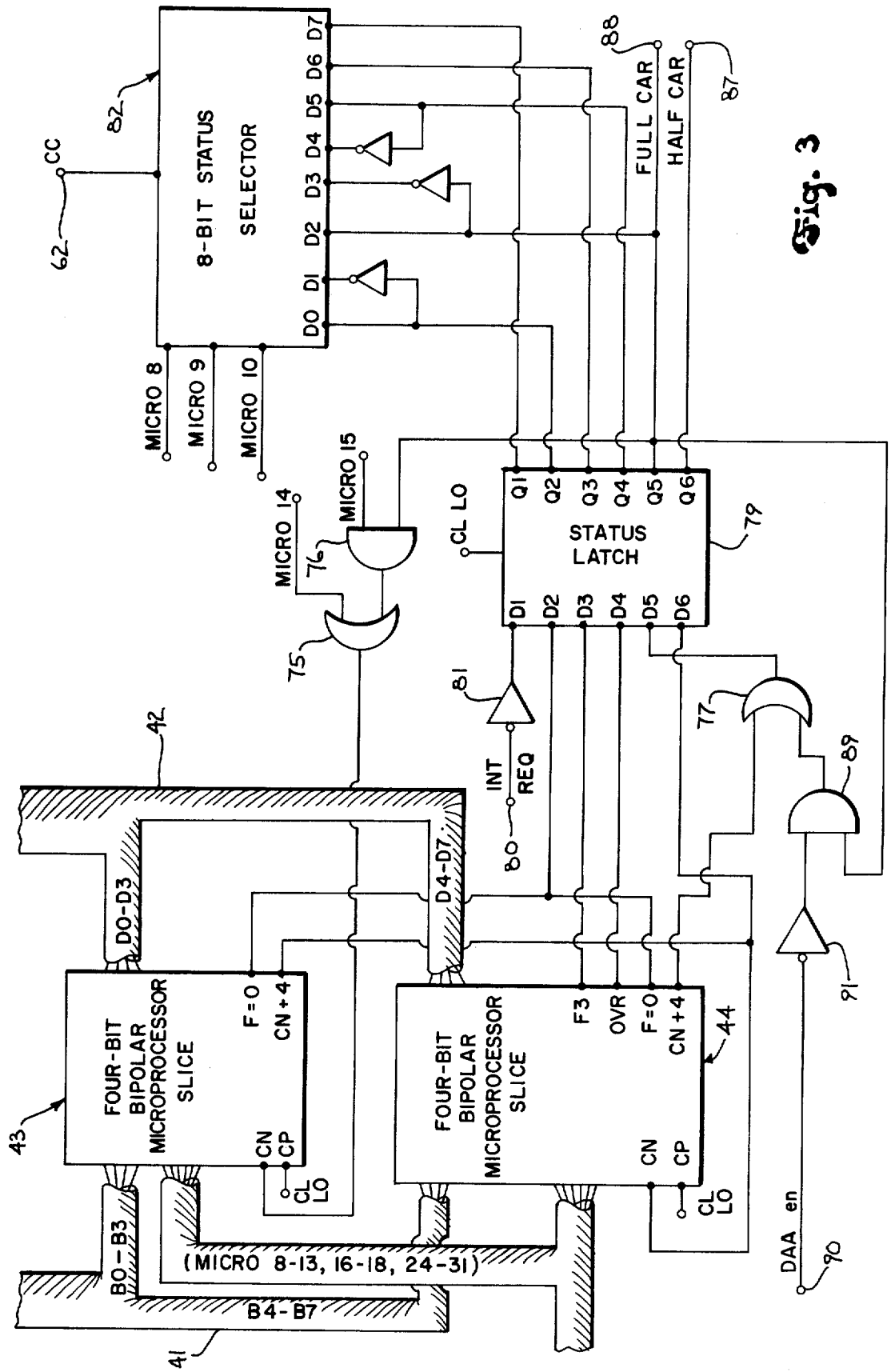
FIG. 3 is an electrical schematic diagram of the central processor unit which forms part of the controller processor of FIG. 2B.

Referring to FIGS. 2A and 2B, the controller processor 2 is organized around a central processor unit 40 which receives data from an eight-lead B-bus 41 and generates data on an eight-lead D-but 42. The central processor 40 is shown in FIG. 3 and it includes a pair of four-bit bipolar microprocessors 43 and 44 which each connect to four leads in the data buses 41 and 42. The microprocessors 43 and 44 are high-speed cascadable elements manufactured and sold commercially by Advanced Micro Devices, Inc. as the Am2901A. A complete description of this microprocessor as well as many of the supporting circuits discussed herein is provided in the publication entitled "Advanced Micro Devices-The Am2900 Family Data Book" published in 1978 by Advanced Micro Devices, Inc.

Referring again to FIG. 2A, the controller data bus 1 is coupled to the processor B data bus 41 by a set of eight data-in gates 45. An enable terminal on each of these gates 45 is commonly connected to a DATA IN control line 46, and when this control line 46 is driven low, an eight-bit byte of data is read onto the B data bus 41.

An eight-bit data-out latch 47 couples the processor D data bus 42 to the controller data bus 1. When a logic high voltage is applied to a DATA DEST control line 48 an eight-bit byte of data on the D data bus 42 is stored in the latch 47, and when a logic low voltage is generated on a DATA OUT control line 49, this eight-bit byte of data is generated on the controller data bus 1. The processor B and D data buses 41 and 42 are thus coupled to the controller data bus 1.

The processor D data bus 42 is also coupled to the controller address bus 3. More specifically, it connects to the inputs of an eight-bit address high latch 50 and to the inputs of an eight-bit address low latch 51. Data is stored in the latch 50 when a logic high voltage is applied to a HI ADDR control line 52, data is stored in the latch 51 when a logic high voltage is applied to a LO ADDR control line 53, and a sixteen-bit address is generated on the controller address bus 3.

Referring particularly to FIGS. 1 and 2A, each controller instruction stored in the control program portion 10 of the RAM 4 includes an operation code which indicates a function to be performed by the controller processor 2. These operation codes are applied to eight input terminals on a mapping PROM 55 which converts them to a starting address of a micro routine that is stored in a microprogram PROM 56. The mapping PROM 55 is a 256×12-bit programmable read-only memory having its twelve data output terminals connected to the twelve leads in a micro-address bus 57. The mapping PROM 55 is "programmed" to convert each eight-bit operation code applied to its eight address terminals into a twelve-bit micro-address. This micro-address is generated on the micro-address bus 57 when a pair of chip enable terminals on the mapping PROM 55 are driven low by a MAP control line 58 and a MICRO 5 control line 59.

The microprogram starting address generated by the mapping PROM 55 is coupled to the microprogram PROM 56 through a microprogram controller 60. The controller 60 is a commercially available integrated circuit manufactured and sold by Advanced Micro Devices, Inc. as Serial No. Am2910. It operates as an address sequencer for controlling the sequence of execution of microinstructions stored in the microprogram PROM 56. A complete description of this device is provided in the above cited publication. It is controlled by a set of five lines (MICRO 0-4) which connect to a 32-bit microinstruction register 61. The controller 60 also receives a signal through a CC control line 62 and it is synchronized with the other elements in the system by an OSC clock line 63. The microprogram controller 60 drives the MAP control line 58, and hence, it controls the mapping PROM 55.

Twelve outputs 64 on the controller 60 connect to the address terminals on the microprogram PROM 56. The microprogram PROM 56 is comprised of eight 1K by eight-bit programmable read-only memories which are interconnected to store 2k 32-bit microinstructions. One of these 32-bit microinstructions is addressed by the microprogram controller 60 and the addressed microinstruction is generated on a bus 65 to the microinstruction register 61. The microinstruction register 61 is comprised of four hex latches and two quad latches which are clocked in synchronism with the microprogram controller 60 through the OSC clock line 63. The microinstruction addressed by the controller 60 is thus read out of the PROM 56 and stored in the microinstruction register 61.

The thirty-two output terminals (MICRO 0-31) on the microinstruction register 61 are connected to various elements in the controller processor to read data from an indicated source, perform indicated functions on the data and to write data into an indicated destination. The controller 60 and microinstruction register 61 are clocked every 200 nanoseconds by the 5 mHz OSC line 63 and a sequence of microinstructions is thus rapidly read out of the microprogram PROM 56 and executed to control the operation of the controller processor 2.

A detailed description of many of the microprograms stored in the PROM 56 is provided hereinafter and a chart of the microfield assignments for "register to register" and "branch" type microinstructions is provided in FIGS. 5A and 5B. A "register immediate" type microinstruction is also employed and its microfield assignments are the same as the register to register microinstruction except that bits 20-27 (i.e., MICRO 20-27) contain an eight-bit byte of data.

Referring particularly to FIG. 2A, when a branch microinstruction is read out of the microprogram PROM 56 and the tested condition is true, the twelve bit target address (MICRO 20-31) is gated through a set of twelve micro-jump gates 67 and applied to the inputs of the microprogram controller 60. The controller 60 is thus preset to read out the microinstruction stored at the target address in the microprogram PROM 56. The micro-jump gates 67 are enabled when the micro clock line (MICRO 5) is at a logic low voltage. Similarly, when a register immediate microinstruction is executed, an eight-bit byte of data in the microinstruction (MICRO 20-27) is coupled through a set of eight immediate gates 68 to the B data bus 41. The immediate gates are enabled by a logic low voltage on an IMM control line 69.

The microprogram controller 60 includes a register/counter (not shown in the drawings) which can be preloaded with a number generated on the D data bus 42. Eight loop gates 70 connect the leads (D0-D7) in the D data bus to the eight least significant digit leads in the micro-address bus 57 and four other gates connect the remaining four leads to a logic low voltage source. Enable terminals on the loop gates 70 are commonly connected to the output of a NOR gate 71 and when neither the micro clock (MICRO 5) nor the MAP line 58 are at a logic low voltage, the gates 70 are enabled. This occurs, for example, when a multiply or divide is to be performed and the register/counter within the microprogram controller 60 is preset to the value of the multiplicand or the divisor.

Referring particularly to FIG. 3, the central processor unit 40 performs the logical and arithmetic functions indicated by the microinstructions. Each four-bit microprocessor slice 43 and 44 connects to outputs on the microinstruction register 61 (MICRO 8-13, 16-18, 24-31) to receive codes that indicate the function which it is to perform. The "carry in" terminal (CN) on the microprocessor slice 44 connects to the "carry out" terminal (CN+4) on the microprocessor slice 43 and the "carry in" terminal (CN) on the microprocessor slice 43 connects to the output of an OR gate 75. The OR gate 75 is connected to the MICRO 14 line and to the output of an AND gate 76. A "carry out" terminal (CN+4) on the microprocessor slice 44 connects to an OR gate 77, and clock terminals (CP) on both microprocessor slices 43 and 44 connect to a clock line (CL LO). As shown in FIG. 2A, the signal on the clock line (CL LO) is derived from a NAND gate 78 which is driven by the 5 mHz OSC line 63 and the micro clock (MICRO 5).

The microprocessor slices 43 and 44 have three additional "status" oriented outputs F3, F=0 and OVR. The F3 output is the most significant (sign) bit, the F=0 output goes high when all bits are zero and the OVR output goes high when an arithmetic operation exceeds the available two's complement number range. The F=0 outputs on both microprocessor slices 43 and 44 are connected to a D2 input on a 6-bit status latch 79. The F3 output and the OVR output on the microprocessor slice 44 connect to the D3 and D4 inputs on the status latch 79 and its CN input connects to the D6 status latch input. The output of OR gate 77 connects to the D5 input on status latch 79 and the status latch D1 input is driven by the INT REQ line 80 through an inverter 81. The status latch 79 is clocked in synchronism with the microprocessor slices 43 and 44 by the CL LO clock line, and after each microinstruction is executed, the status of the microprocessor is stored and generated at a set of status latch output terminals Q1-Q6.

Referring particularly to FIGS. 2A and 3, five of the six status latch outputs connect to inputs D0-D7 on an 8-bit status selector 82. The output of the status selector 82 drives the CC control line 62 that connects to the microprogram controller 60. The three data select terminals on the selector 82 are driven by microinstruction register outputs (MICRO 8, 9 and 10). During a branch microinstruction for example, one of the eight status selector inputs is generated on the CC control line 62, and if the condition of that status bit is true, a branch in the microprogram is to occur. In such case, a target address in the same branch microinstruction is loaded into the microprogram controller 60 through the micro-jump gates 67 to execute the branch operation.

Referring particularly to FIGS. 2B and 3, to assist the central processor unit 40 in executing programmable controller macroinstructions, a decimal adjust accumulator 85 and a bit pointer circuit 86 are coupled to it through the B-bus 41 and the D-bus 42. The decimal adjust accumulator is a 512 by 8-bit PROM which has its address input terminals A0, A1, A2, A4, A5, A6 and A7 connected to respective D-bus leads D1-D7 and which has its eight data output terminals connected to leads B0-B7 in the B-bus 41. Address terminals A3 and A8 on the decimal adjust accumulator 85 connect to respective control lines HALF CAR 87 and FULL CAR 88. HALF CAR line 87 connects to the Q6 output on the status latch 79 and the FULL CAR line 88 connects to the Q5 output. The FULL CAR line 88 is also coupled through gates 76 and 75 back to the "carry in" terminal CN on the microprocessor slice 43 and it is coupled through an AND gate 89 and OR gate 77 to the D5 input on the status latch 79. A carry generated by the decimal adjust accumulator is thus OR'd with any carry generated by the binary arithmetic operation.

The decimal adjust accumulator 85 is enabled during arithmetic calculations by a DAA EN control line 90. The DAA EN control line 90 also connects through an inverter 91 to a second input on the AND gate 89. The arithmetic data operated upon by the central processor unit 40 is in binary coded decimal, whereas the microprocessor slices 43 and 44 only add and subtract binary numbers. It is the function of the decimal adjust accumulator 85 to adjust the eight-bit result of an arithmetic operation which appears on the D-bus 42 along with the carry bits which appear on lines 87 and 88, to generate the proper arithmetic result as two BCD digits on the B-bus 41. More specifically, the decimal adjust accumulator generates 00, 06, 60 or 66 (Hexadecimal) which is added to the 8-bit binary number that results from an arithmetic function to convert it to a two-digit BCD number. The contents of the decimal adjust accumulator are listed in Appendix A.

The bit pointer circuit 86 is a 32×8-bit PROM which has its eight data output terminals connected to the leads B0-B7 in the B-bus 41. Four of its address input terminals (A0-A3) are connected to the respective outputs on a bit pointer code latch 95 and its fifth address input (A4) is connected to a logic low voltage. The four inputs on the latch 95 are connected to the leads B0-B3 in the B-bus 41 and when the latch 95 is clocked by a gate 96, a bit pointer code from a controller instruction is stored therein. This bit pointer code is converted to a mask by the bit pointer circuit 86 in which all but one of eight bits are at a logic low voltage. This mask is generated on the B-bus 41 when the bit pointer circuit 86 is enabled through a MASK control line 97. The mask generated by the bit pointer circuit 86 is employed to carry out single-bit calculations which consume a considerable proportion of the calculating time. The bit pointer circuit 86 thus serves to speed up the rate at which the central processor unit 40 can execute the bit instructions described above.

Figure 4:
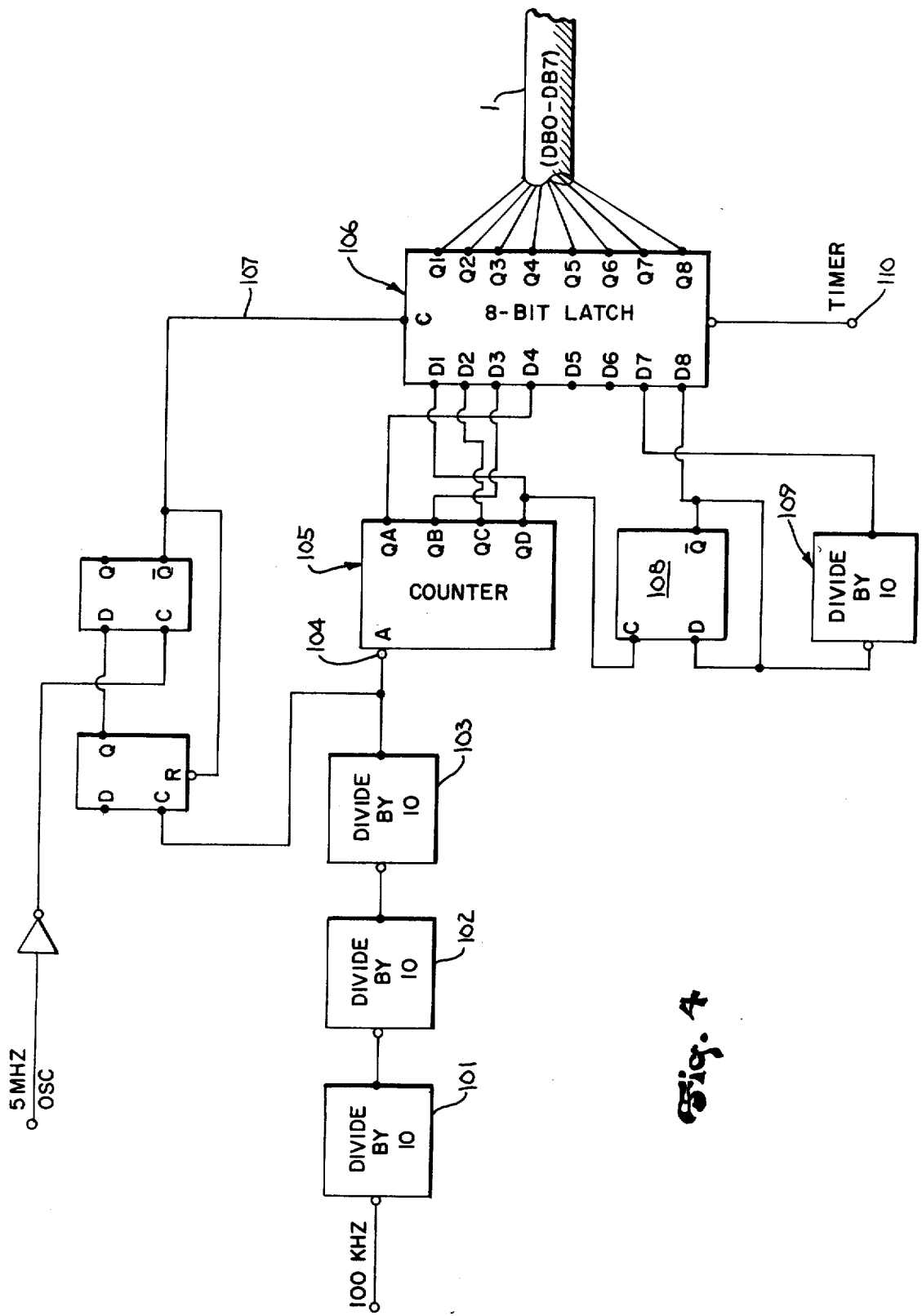
FIG. 4 is an electrical schematic diagram of the real time clock circuit which forms part of the controller processor of FIG. 2A, FIGS. 5A and 5B are schematic representations of the microinstruction field assignments.

Referring particularly to FIGS. 2A and 4, to enable the controller processor to execute timer instructions, a real time clock circuit 100 is coupled to the data bus 1. The real time clock circuit 100 includes three series connected divide by ten circuits 101-103 which reduce an applied 100 kHz signal to a 100 hertz clock signal. The 100 hertz clock signal is applied to the A input 104 on a four-bit binary counter 105 and the four outputs (QA-QD) on this counter 105 connect to the four inputs (D1-D4) on an 8-bit latch 106. The counter 105 counts ten millisecond time intervals and when the latch 106 is clocked through a control line 107, the contents of the counter 105 is stored in the latch 106.

The QD output on the counter 105 also connects to the C input of a D-type flip-flop 108. At the $\bar{Q}$ output of the flip-flop 108 is a clock signal which changes state once every 0.1 seconds and this is applied both to the D8 input of the 8-bit latch 106 and to the input of a divide by ten circuit 109. The output of the divide by ten 109 changes state once every one second and it is connected to the D7 input on the 8-bit latch 106. When a logic low voltage is applied to the latch 106 through a TIMER control line 110, the contents of the latch 106 is output to the data bus 1.

As will be explained in more detail hereinafter, each time a timer macroinstruction is executed, (i.e., TOF, TON, RTO) the state of the real time clock is checked to determine if a time interval has elapsed since the same timer instruction was last executed. When 1.0 and 0.1 time increments are involved, the state of a single-bit (Q7 or Q8 on the latch 106) is examined to determine if it has changed. However, this cannot be done when ten millisecond timer instructions are employed because the timer instruction may not be executed within every 10 millisecond time increment. Therefore, when a ten millisecond timer macroinstruction is executed, the four-bit binary count (Q1-Q4 on the latch 106) is examined and this count is compared with a previous count to determine how many 10 millisecond time increments have elapsed since the previous scan through the control program. This will be described in more detail hereinafter in connection with the TON 0.01 microroutine.

Figure 6:
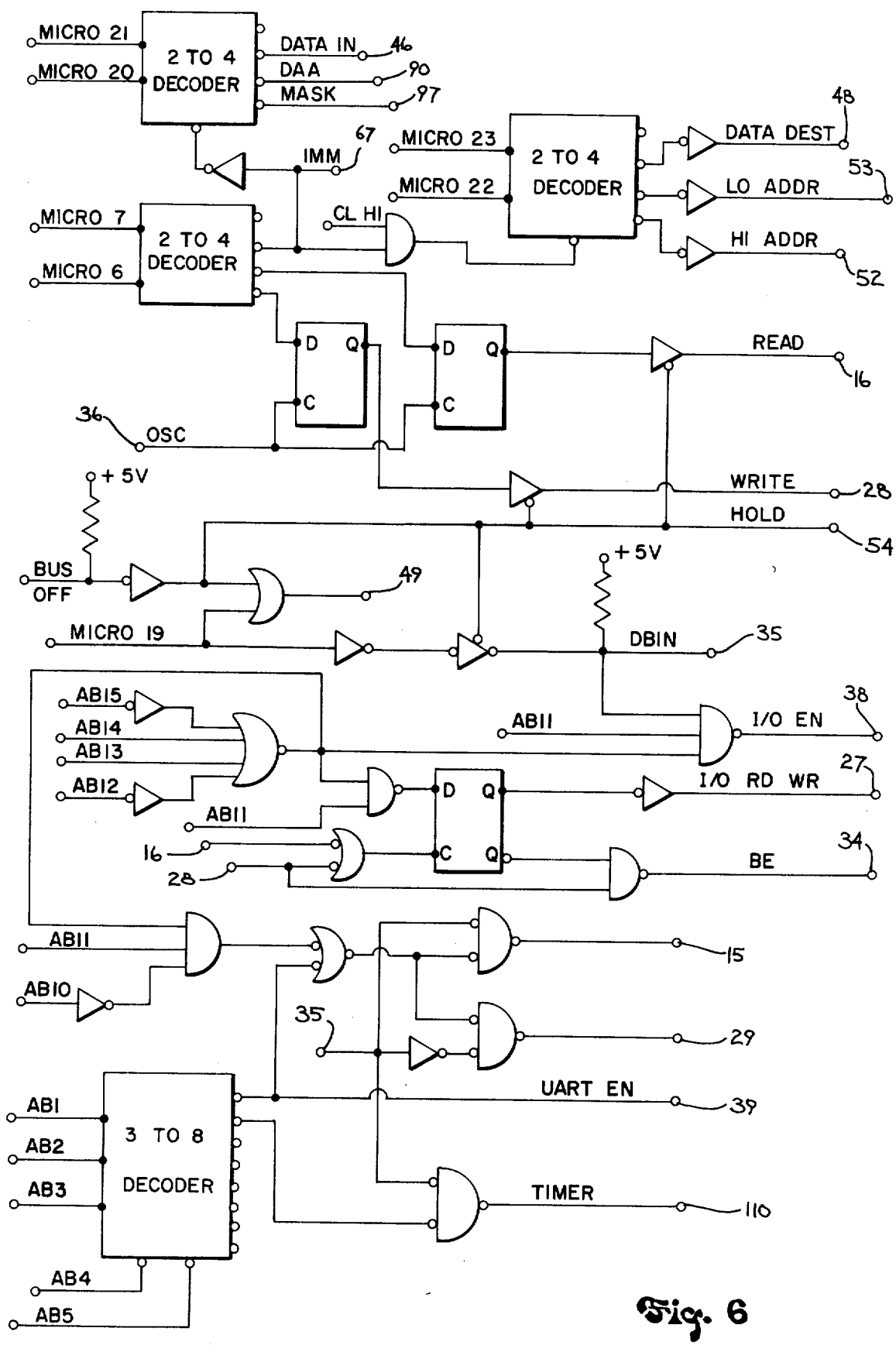
FIG. 6 is an electrical schematic diagram of the decoder circuit which forms part of the controller processor of FIG. 2B.

Referring to FIGS. 2B and 6, the control lines which operate the various elements of the programmable controller emanate from a decoder circuit 115. The signals on the control lines which operate the controller processor elements are derived directly from the microinstruction in the microinstruction register 61. On the other hand, the remaining elements in the programmable controller are "memory mapped" and hence the signals on their control lines are derived in part from the address code on the address bus 3. Numerous decoding techniques are known in the art and the detailed decoding employed in the preferred embodiment described herein is illustrated in FIG. 6.

Figure 7:
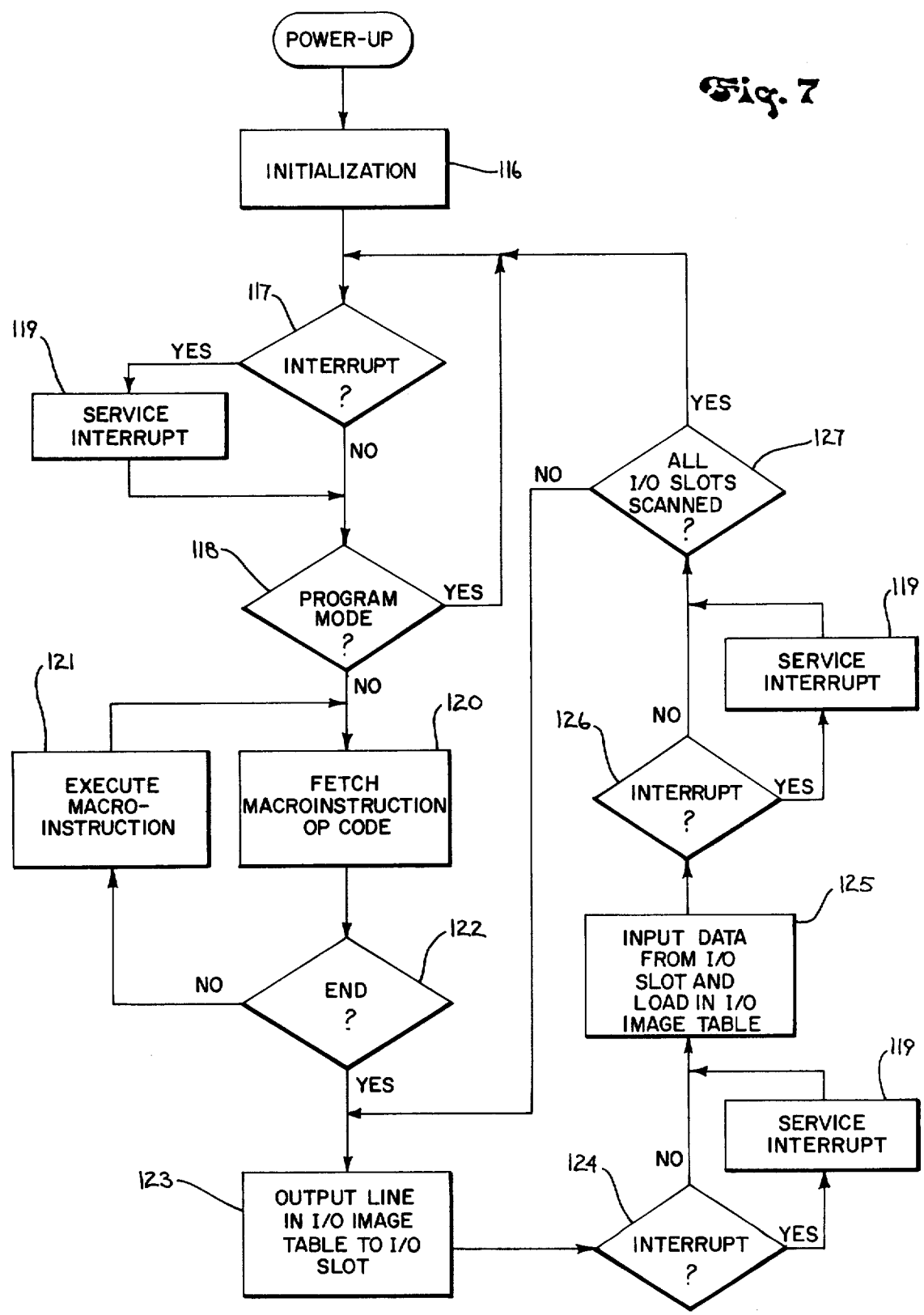
FIG. 7 is a flow chart which illustrates the general operation of the programmable controller of FIG. 1, FIGS. 8A and 8B are a flow chart which illustrates the manner in which the programmable controller of FIG. 1 executes the TON.01 macroinstruction.

Referring to FIG. 7, the programmable controller sequentially executes microinstructions stored in the microprogram PROM 56 to carry out its functions. After power-up, microinstructions are executed to initialize the system as indicated by process block 116 and then the status latch 79 is examined to determine if an interrupt request is present as indicated by decision block 117. A mode switch (not shown in the drawings) is then examined as indicated by decision block 118 to determine if the system is in the "program" mode. If it is, the system remains in a loop in which repeated interrupts are generated by the UAR/T 12 and data is entered into the read/write memory 4 by the user and edits are made to this data.

When the system is switched to the "run" mode, it branches to a fetch microroutine which reads the operation code in the first control program macroinstruction out of the memory 4, as indicated by process block 120. This operation code is applied to the mapping PROM 55 which presets the microprogram controller 60 to address the microroutine which corresponds to that operation code. The microroutine is then executed to carry out the function indicated by the macroinstruction as illustrated by process block 121. The system then loops back to fetch the next macroinstruction operation code in the control program 10. The system remains in the loop until the entire control program 10 has been executed.

The last macroinstruction in the control program 10 is an "END" macroinstruction which is mapped into a microroutine that performs an I/O scan. As shown in FIG. 7, when this microroutine is executed the system branches at decision block 122 and the first line in the output portion of the I/O image table 8 is output to the first I/O slot as indicated by process block 123. A check is then made for an interrupt request as indicated by decision block 124 and data is then input from the same I/O slot and written into a line in the input portion of the I/O image table 8 as indicated by process block 125. A check is again made for an interrupt request as indicated by decision block 126 and then the system loops at decision block 127 to continue the I/O scan. When completed, the system branches back to decision block 117 to completely repeat control program 10 again. It typically takes from 5 to 20 milliseconds to execute the entire control program and perform the I/O scan and this loop is continuously executed while the programmable controller is in the run mode.

The microprocessor slices 43 and 44 include sixteen internal registers S0–S15 which are employed for very specific functions during the execution of the control program 10. These functions are listed in Table A.

TABLE A

| | |
|---|---|
| S0 and S1 | Sixteen-bit address of next control instruction (i.e., macroprogram counter). |
| S2 and S3 | Storage for high and low bytes of operand address. |
| S6 and S7 | Sixteen-bit accumulator I. |
| S8 and S9 | Sixteen-bit accumulator II. |
| S11 | Rung condition register. All ones equal true, zeros equal false. |
| S12 | First branch flag, or rung condition save register. |
| S13 | Rung condition, branch or accumulator. |
| S14 | Master control relay - when zero all results forced false, when all ones is inactive. |
| S15 | General register. |

As indicated generally above, the macroinstruction operation codes are read out of the control program portion 10 of the memory 4 by the FETCH microroutine which is stored in the microprogram PROM 56. This microroutine is listed in Table B and as will become more apparent hereinafter, this microroutine can be entered at a number of locations which are separately labeled

TABLE B

FETCH MICROROUTINE

| Label | Instruction | Comment |
|---|---|---|
| NEWFET | S11=OFF | Set Rung Condition register to all ones, or "true" condition. |
| NFET+1 | S12=080 | Set first branch flag to indicate that no branch has occurred up to this point in the run diagram. |
| FET−1 | S2=160 | Preset the high byte of the control instruction operand address. |
| FETCH | ADDL A1=S1−1<br>ADDH A0=S0−C READ | Set the address lines to the current operation code and initiate memory read. Set registers S0 and S1 to the operand address. |
| | Q=3<br>ADDL A1=S1+Q IN<br>ADDH A0=S0+C IN<br>N=DATA MAP IN | Set address lines to the operand address and increment S1 and S0 registers to point to next operation code. Enable mapping PROM to receive operation code and preset microprogram controller 60 to start of corresponding microroutine. |

The microinstructions in the FETCH microroutine and the other microroutines stored in the PROM 56 are executed at the rate of one every 200 nanoseconds. On the other hand, a "READ" from the memory 4 may require a full microsecond, and as a result, after a memory READ is initiated, the data will not appear until the fifth microinstruction thereafter. During the interim other processing can take place or no-operation microinstructions (CONT) can be executed to make time.

The FETCH microroutine reads the operation code in a controller macroinstruction and employs it to map to the corresponding mircroroutine which will carry out the required functions. The microroutines for a number of representative programmable controller operation codes are listed in Table C. Where the controller macroinstruction includes an operand address, this 8-bit byte of data is then read from the memory 4 and is employed to form a 16-bit address which identifies the memory location of the operand. The microroutine performs its function, and when it is completed, it branches back to the FETCH microroutine to read out the operation code of the next programmable controller macroinstruction.

TABLE C

| Label | | Instruction | Comment |
|---|---|---|---|
| BST | | S12=S12 | IF FIRST BRANCH FLAG=1, |
| | | B BST01 MINS | JUMP TO BST01 |
| | | S13=S13 OR S11 | ELSE UPDATE OR ACCUMULATOR |
| | | S11=NOT S13 | AND SET SUB-RUNG CONDITION |
| | | B FET−1 | BRANCH TO FETCH MICROROUTINE |
| BST01 | | Q=S11 | |
| | | S12=OF AND Q | SAVE RUNG CONDITION AND CLEAR FIRST BRANCH FLAG |
| | | S13=NOT S11 | INITIALIZE OR ACCUMULATOR |
| | | B FET−1 | BRANCH TO FETCH MICROROUTINE |
| BND | | Q=S12 | LOOK AT SAVE REGISTER |
| | | Q=00F AND Q | MASK OUT 1ST BST FLAG |
| | | B BND01 ZERO | JUMP IF RUNG WAS FALSE |
| | | Q=S11 OR S13 | ELSE LOOK AT LAST BRANCH OR ACCUM |
| BND01 | | S11=Q | SET RUNG CONDITION |
| | | S12=080 | SET 1ST BST FLAG |
| | | B FET−1 | BRANCH TO FETCH MICROROUTINE |
| XIC | | S11=S11 READ | IS RUNG ALREADY FALSE? |
| | | B FET−1 ZERO | JUMP IF ALREADY FALSE |
| | ADDH | N=S2 IN<br>CONT IN | S2 HAS HIGH BYTE OF OPERAND ADDRESS |
| | ADDL | N=DATA IN | SET ADDL TO LOW BYTE OF ADDRESS |

TABLE C-continued

| Label | | Instruction | Comment |
|---|---|---|---|
| | | Q=MASK READ | READ MASK SET UP BY BIT POINTER |
| | | S2=160 | PRESET S2 TO HIGH BYTE OF I/O |
| | | CONT IN | IMAGE TABLE STARTING ADDRESS FOR |
| | | CONT IN | NEXT INSTRUCTION (TO CLEAR EFFECT OF AN ADX) |
| | | N=DATA AND Q IN | READ AND MASK THE BIT DESIRED |
| | | B FETCH NZER | JUMP IF BIT IS "1" |
| | | S11=0 | ELSE SET RUNG CONDITION FALSE |
| | | B FETCH | BRANCH TO FETCH MICROROUTINE |
| XIO | | S11=S11 READ | IS RUNG ALREADY FALSE? |
| | | B FET−1 ZERO | JUMP IF ALREADY FALSE |
| | ADDH | N=S2 IN | INPUT OPERAND ADDRESS AND |
| | | CONT IN | |
| | ADDL | N=DATA IN | SET ADDRESS LINES TO POINT TO OPERAND |
| | | Q=MASK READ | READ MASK SET UP BY BIT POINTER |
| | | S2=160 | PRESET S2 TO HIGH BYTE OF I/O |
| | | CONT IN | IMAGE TABLE STARTING ADDRESS |
| | | CONT IN | |
| | | N=DATA SZC Q IN | INVERT DATA, THEN MASK DESIRED BIT |
| | | B FETCH NZER | JUMP IF BIT IS OFF (0) |
| | | S11=0 | ELSE, SET RUNG CONDITION FALSE |
| | | B FETCH | BRANCH TO FETCH MICROROUTINE |
| OTE | | N=S11 and S14 READ | RUNG TRUE AND MCR INACTIVE? |
| | | B OTU01 ZERO | JUMP IF FALSE (TURN OUTPUT OFF) |
| | | B OTL01 IN | JUMP IF TRUE (TURN OUTPUT ON) |
| OTL | | N=S11 AND S14 READ | RUNG TRUE AND MCR INACTIVE? |
| | | B NEWFET ZERO | LEAVE OUTPUT ALONE IF RUNG FALSE |
| | | CONT IN | |
| OTL01 | | S11=OFF IN | SET RUNG CONDITION TRUE |
| | ADDL | N=DATA IN | SET ADDRESS LINES TO OPERAND |
| | ADDH | N=S2 READ | READ IN EXISTING DATA |
| | | Q=MASK | BIT POINTER MASK |
| | | S12=080 IN | SET 1ST BST FLAG FOR NEXT RUNG |
| | | S2=160 IN | PRESET S2 TO HIGH BYTE OF I/O |
| | DATA | Q=DATA OR Q IN | IMAGE TABLE STARTING ADDRESS |
| | | CONT READ | WRITE NEW DATA BACK |
| | | CONT WRIT | |
| | | B FETCH WRIT | BRANCH TO FETCH MICROROUTINE |
| OTUL | | N=S11 AND S14 READ | RUNG TRUE AND MCR INACTIVE |
| | | B NEWFET ZERO | LEAVE OUTPUT ALONG IF RUNG FALSE |
| OTU01 | | CONT IN | |
| | | S11=OFF IN | SET RUNG CONDITION TRUE |
| | ADDL | N=DATA IN | SET ADDRESS LINES TO OPERAND |
| | ADDH | N=S2 READ | |
| | | Q=NOT MASK | BIT POINTER MASK |
| | | S12=080 IN | SET 1ST BST FLAG FOR NEXT RUNG |
| | | S2=160 IN | PRESET S2 TO HIGH BYTE OF I/O |
| | DATA | N=DATA AND Q IN | IMAGE TABLE STARTING ADDRESS |
| | | CONT READ | WRITE NEW DATA BACK |
| | | CONT WRIT | |
| | | B FETCH WRIT | BRANCH TO FETCH MICROROUTINE |

Referring particularly to FIG. 1, the 8-bit operand address which accompanies many of the controller instruction operation codes identifies a line in the I/O image table 8 or the timers and counters portion 9 of the memory 4. The 8-bit operand address is loaded into the S3 register and it serves to select one of 256 lines in a "page" of the memory 4. The particular page is selected by the 8-bit high address byte which is loaded into the S2 register. In prior programmable controllers this high address byte is preset to a selected value which is the address of the first line in the I/O image table 8 and it cannot be changed by the control program instructions. As a result, the I/O image table 8 and timers and counters portion 9 have in the past been limited in size to 256 lines—that is, the addressing range of the 8-bit operand address in the controller instructions.

As indicated in the above listed microroutines, the high address byte is preset to a "base page" address of 160 (decimal) in the preferred embodiment. Unlike prior programmable controllers, however, this value can be altered by the execution of an ADX macroinstruction. The ADX microroutine which is executed each time the ADX operation code is fetched from the memory 4 is listed in Table D.

TABLE D

| Label | Instruction | Comment |
|---|---|---|
| ADX | CONT READ | Read operand of ADX in- |
| | CONT | struction which is high |
| | CONT IN | address byte for next controller instruction. |
| | S2=080 IN | Set register S2 to high |
| | S2=DATA OR S2 IN | address byte indicated |
| | B FETCH | by ADX operand and branch to FETCH microroutine |

By employing the ADX macroinstruction in the control program 10, the range of the operand addresses in the control instructions can be increased from 256 lines (8-bit operand address) to 65 K lines (16-bit operand address). The net result of this enhanced addressing capability is that the I/O image table 8 and the timers and counters portion 9 can be expanded to meet the requirements of any programmable controller application.

It should be noted that whenever the ADX macroinstruction is not present, the high address byte (stored in register S2) is automatically preset to the base page prior to reading the operand. This is accomplished in a number of ways. Referring to the above microroutine listings, for example, it may be accomplished by branching to the label "FET-1" in the FETCH microroutine after the execution of the macroinstruction interpreter microroutine (see BST and BND). On the other hand, the register S2 may be preset by a specific microinstruction within the macroinstruction interpreter microroutine being executed (see OTL and OTU). When the ADX macroinstruction is not employed, therefore, the S2 register is preset by default to the base page address.

The ADX macroinstruction may be employed before any programmable controller instruction to increase the addressing range of its operand address. It accomplishes this result by loading its own operand address into the register S2 and bypassing any microinstructions which would otherwise preset register S2 to the base page address. The register S2 remains set to this modified address until the operand for the following controller macroinstruction is read from the memory 4, after which it is again preset to the base page address. Because the ADX macroinstruction modifies, or expands, only the operand address of the controller macroinstruction which follows it, the ADX macroinstruction must be used before each controller macroinstruction which operates on data outside the 256 line base page. In the preferred embodiment the ADX macroinstruction is automatically inserted in the control program 10 by the program panel 11 and its use is thus "transparent" to the user.

The manner in which the real time clock circuit 100 and the decimal adjust accumulator 85 operate in the programmable controller can be demonstrated by explaining the manner in which the programmable controller executes the TON.01 macroinstruction. As indicated above, each time the TON.01 instruction is executed, a test is made to determine if the "rung" of which it is a part is true. If it is, a preset time interval is measured and then a selected bit is set high to indicate that the timer has timed out. The TON.01 macroinstruction measures 10 millisecond time increments and it includes an 8-bit operand address which points to an accumulated time and preset value stored in the timers and counters portion 9 of the memory 4. Of course, it is one of the advantages of the present invention that this 8-bit operand address can be expanded to 16-bits by the use of the ADX macroinstruction as described above, and hence, the accumulated time and preset value associated with a timer can be stored anywhere in the memory 4.

Figure 8A:
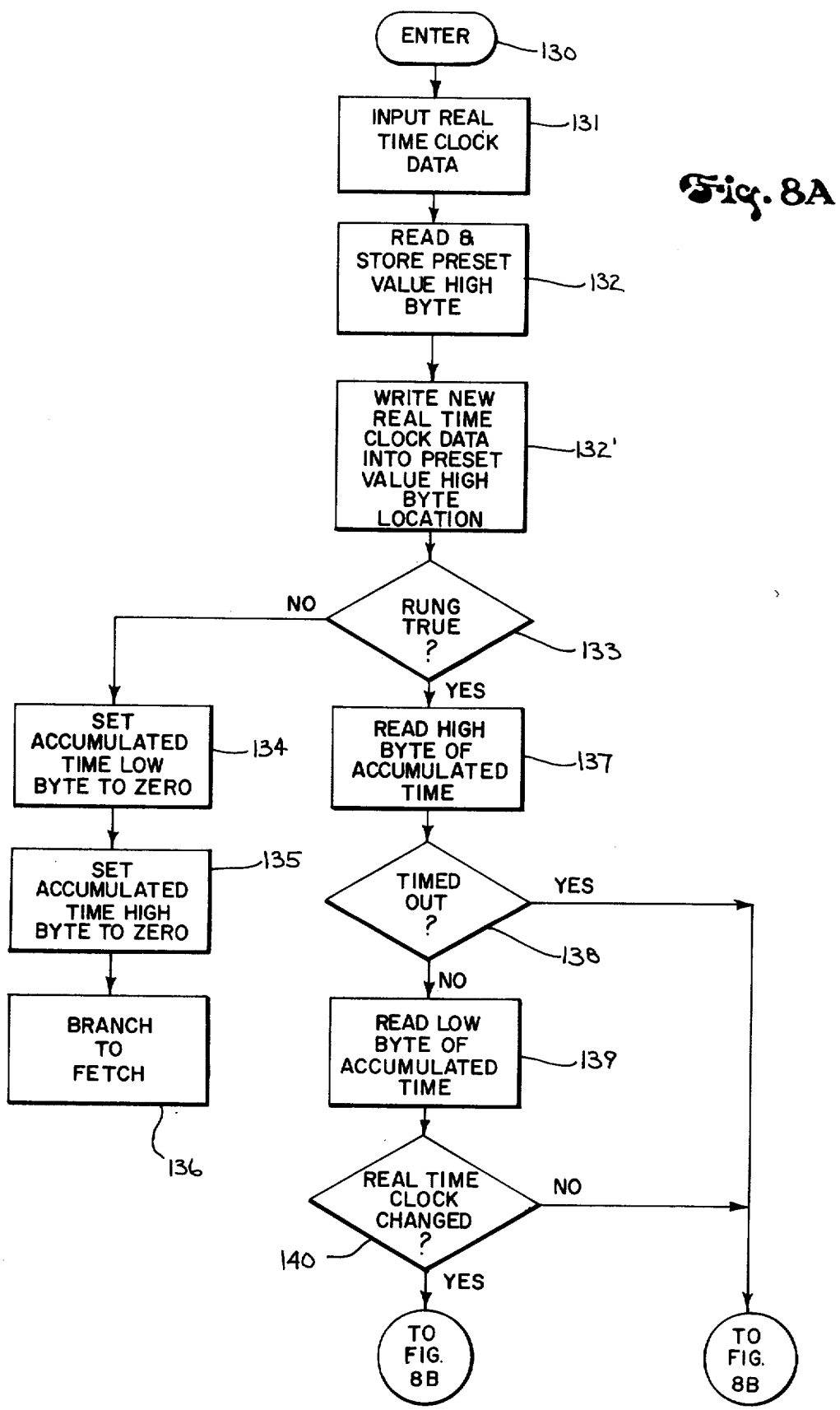
Figures 8B, 9:
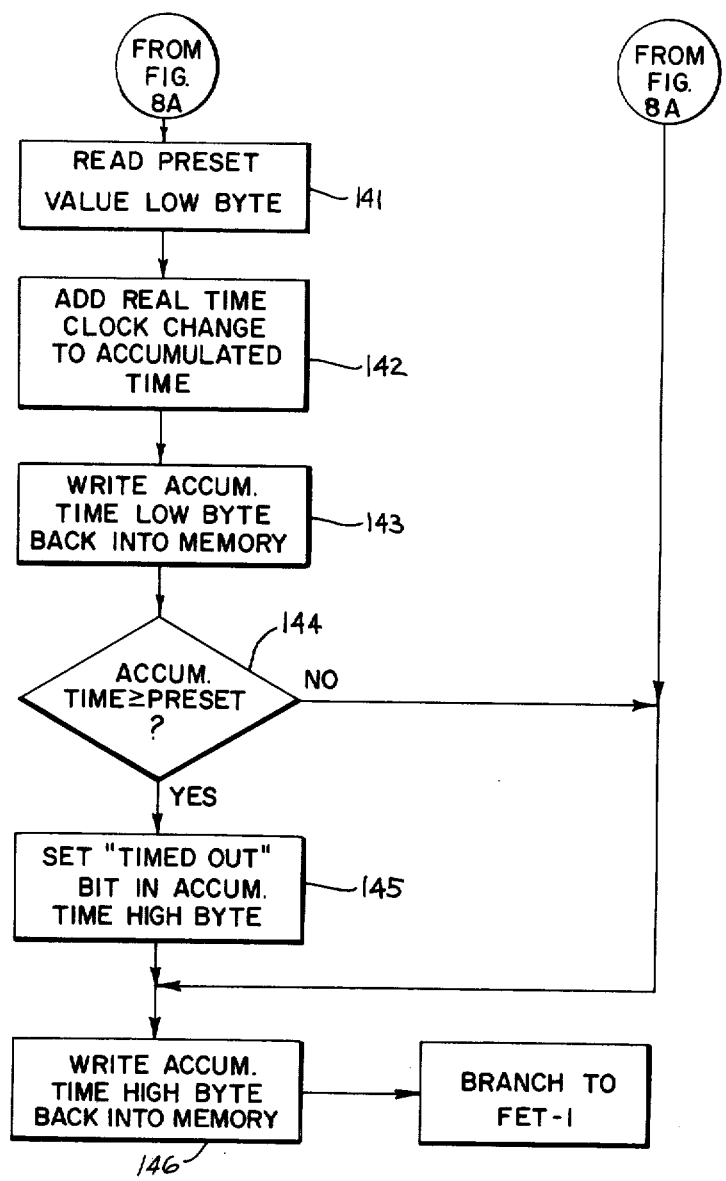
FIG. 9 is a schematic illustration of the contents of four memory lines which are dedicated to function as part of a ten millisecond counter.

Referring to FIG. 9, the operand for each TON.01 macroinstruction includes a two byte preset value and a two byte accumulated time. The accumulated time includes three BCD digits which indicate the number of 10 millisecond time increments that have elapsed since timing began and the preset value includes three BCD digits which indicate the number of 10 millisecond time increments which must be accumulated before the timer "times out." The three BCD digit preset value is loaded into the memory 4 by the user when the control program 10 is developed using the program panel 11.

Associated with the high byte of the accumulated time are four status bits which indicate the state of the timer. More specifically, bit seven provides an indication of whether the timer has started timing, and bit five indicates whether or not it has timed out. Also, associated with the high byte of the preset value is a 4-bit storage location which stores the value of the 10 millisecond counter output of the real time clock circuit 100.

There may be one or more TON.01 macroinstructions in the control program 10, and during each scan through the control program 10 each of these are executed. A listing of the TON.01 microroutine is provided in Table E and a flow chart of this microroutine is illustrated in FIGS. 8A and 8B. Referring first to this flow chart, the operation code for the TON.01 macroinstruction is mapped into its corresponding microroutine which is entered at 130. Microinstructions indicated by process block 131 are then executed to input data from the real time clock circuit 100 and the preset value high byte is read from the memory 4 and stored in the microprocessor as indicated by process block 132. The new real time clock value is then written into the preset value high byte for use when the timer macroinstruction is executed next as indicated by process block 132'. The status of the ladder diagram rung of which the timer is a part is then examined as indicated by decision block 133. The rung status is stored in the register S11, and if conditions are not proper for the timer to operate, the register S11 is zero and the system branches at decision block 133. In such case, zeros are written into the accumulated time low byte and high byte as indicated by process blocks 134 and 135 and the system branches back to the FETCH microroutine as indicated by process block 136.

When conditions are proper for the timer to start or continue timing, as determined at decision block 133, the high byte of the accumulated time is read out of the memory 4 as indicated at process block 137. Bit 5 of this high byte is checked to see if the timer has timed out, as indicated by decision block 138, and if it has, the microroutine branches. Otherwise, the accumulated time low byte is read from the memory 4 as indicated by process block 139. The previous value of the ten millisecond counter, which forms part of the preset value high byte, is then compared with the current value of the ten millisecond counter. If no change has occurred (i.e., the control program scan time is less than ten milliseconds) the microroutine branches at decision block 140. Otherwise, the preset value low byte is read from the memory 4, as indicated by process block 141, and the change in the ten millisecond real time clock is then added to the three digit accumulated time number as indicated by process block 142. The accumulated time low byte is then written back into the memory 4 as indicated by process block 143 and the three digit accumulated time number is then compared with the three digit preset value number. As indicated by decision block 144, if the accumulated time has reached or exceeded the preset value, the "timed out" bit (bit 5) in the accumulated time high byte is set to "one" as indicated by process block 145. In either case, the accumulated time high byte is written back into the memory 4 as indicated by process block 146 and the system then branches to the FETCH microroutine to read the next macroinstruction from the control program.

TABLE E

| Label | | Instruction | Comment |
|---|---|---|---|
| TON01 | | BL TIMER READ | CALL TIMER SUBROUTINE AND START OPERAND ADDRESS READ |
| | | S6=0 | |
| | | N=S11 AND S14 | CHECK IF RUNG IS TRUE AND MCR IS INACTIVE |
| | | B CLRACC ZERO | JUMP IF EITHER IS FALSE |
| TON00 | | S3=S3−1 | SET S3 TO PRESET VALUE LOW BYTE ADDRESS |
| | ADDL | S3=S3−1 READ | SET ADDL=S3 = ACC HI BYTE ADDRESS |
| | | S3=S3−1 | SET S3 TO LOW BYTE ADDRESS |
| | | S2=020 IN | MASK FOR TIMED OUT BIT |
| | ADDL | A3=S3+1 IN | SET ADDL= ACC LOW, S3 = ACC HI ADD |
| | | Q=DATA IN | STORE ACCUMULATED TIME HIGH BYTE IN Q REGISTER |
| | | S3=S3+1 READ | SET S3 TO PRESET VALUE LOW BYTE ADDRESS |
| | | S6=02F AND Q | SAVE ACC HI BYTE WITH TIMED OUT BIT |
| | | N=S2 AND Q IN | LOOK AT TIMED OUT BIT |
| | | B SETTON NZER IN | JUMP IF PREVIOUSLY TIMED OUT |
| | | S7=DATA IN | STORE ACCUMULATED TIME LOW BYTE IN S7 |
| | | Q=S15 − S9 | SUBTRACT OLD CLOCK BITS FROM CURRENT 10 MSEC CLOCK BITS |
| | | B SETTON ZERO | JUMP TO SETTON IF NO CHANGE IN 10 MSEC CLOCK |
| | | B NOINC CARR | JUMP TO NOINC IF RESULT IS POSITIVE |
| | | Q=0A0+Q | OTHERWISE, ADD 10 TO MAKE IT POSITIVE |
| NOINC | ADDL | A3=S3−1 READ | READ PRESET VALUE LOW BYTE AND SET, S3= ACC TIME HIGH BYTE ADDRESS |
| | | R15=Q | STORE CHANGE IN 10 MSEC CLOCK IN S15 |
| | | R15=S15 IN | SHIFT 10 MSEC CLOCK BITS |
| | | R15=S15 IN | |
| | | S9=DATA IN | LOAD PRESET VALUE LOW BYTE INTO S9 |
| | | R15=S15 | |
| | | S7=S7+S15 | ADD CHANGE IN 10 MSEC CLOCK TO ACCUMULATED TIME LOW BYTE |
| | | A7=DAA+S7 | ADJUST TO BCD USING DECIMAL ADJUST ACCUMULATOR |
| | | S6=S6+C | ADD CARRY OUT TO ACCUMULATED TIME HIGH BYTE |
| | | A6=DAA+S6 | ADJUST TO BCD |
| | ADDL | S3=S3−1 READ | ADDL = S3 = ACC TIME LOW BYTE ADDRESS |
| | DATA | S7=S7 WRIT | WRITE ACCUMULATED TIME LOW BYTE BACK INTO MEMORY |
| | | N=S6−S8 WRIT | COMPARE ACC TO PRESET |
| | | B ST17 NCAR | JUMP IF ACC < PRESET |
| | | B TOUT NZER | JUMP IF ACC > PRESET |
| | | N=S7−S9 | ELSE CHECK LOW BYTES |
| | | B ST17 NCAR | JUMP IF ACC < PRESET |
| TOUT | | S6=S6 OR S2 | SET TIMED OUT BIT IN ACCUMULATED TIME HIGH BYTE |
| ST17 | | S12=080 | SET 1ST BST FLAG |
| | ADDL | S3=S3+1 READ | ADDRESS ACCUMULATED TIME HIGH BYTE MEMORY LOCATION |
| | DATA | N=S6 OR S12 WRIT | WRITE ACCUMULATED TIME HIGH BYTE INTO MEMORY |
| | | B FET−1 WRIT | JUMP TO FETCH MICROROUTINE |
| SETTON | | S3=S3−1 | SET S3 TO ACC HIGH BYTE ADDRESS |
| | | S3=S3−1 | SET S3 TO ACC LOW BYTE ADDRESS |
| | | B ST17 | |
| CLRACC | ADDL | S3=S3−Q READ | SET ADDL TO ACC LOW (Q = 3) |
| | DATA | N=0 WRIT | ZERO IT |
| | | S11=S11−S11−1 WRIT | INITIALIZE RUNG COND TRUE (FF) |
| | | S2=160 | DEFAULT OPERAND HIGH ADDRESS |
| | | S12=080 | SET 1ST BST FLAG |
| | DATA | N=S6 WRIT | WRITE ZERO INTO ACC HIGH |
| | | B FETCH WRIT | JUMP TO FETCH MICROROUTINE |
| TIMER | | S7=#RTC | LOAD REAL TIME CLOCK ADDRESS INTO S7 AND S6 |
| | | S6−#IO IN | |
| | | S3=OFC IN | |
| | | S3=DATA AND S3 IN | MASK 2 LSB OFF OF OPERAND ADDRESS |
| | ADDH | S6=S6 | SET ADDRESS LINES TO READ |
| | ADDL | N=S7 READ | REAL TIME CLOCK AND STORE |
| | | S15=DATA IN | REAL TIME CLOCK DATA IN S15 |
| | ADDH | S2=S2 | |

TABLE E-continued

| Label | Instruction | Comment |
|---|---|---|
| | ADDL S3=S3+Q READ S9=0F0 | READ PRESET VALUE HIGH BYTE |
| | S15=S15 AND S9 IN | MASK ALL BUT 10 MSEC CLOCK DATA |
| | S8=OF IN | MASK FOR PRESET VALUE |
| | S7=DATA IN | STORE PRESET VALUE HIGH BYTE IN S7 |
| | S8=S8 AND S7 READ | STORE MSB OF PRESET VALUE IN S8 |
| DATA | N=S8 OR S15 WRIT | OR PRESET WITH NEW 10 MSEC CLOCK BITS |
| | S9=S9 AND S7 RT WRIT | STORE OLD CLOCK BITS IN S9 and RETURN |

The decimal adjust accumulator is employed in the TON.01 microroutine to add the change in the ten millisecond real time clock counter to the accumulated time number. The accumulated time number is comprised of three BCD digits (LSBCD, MBCD, MSBCD) and the microprocessor slices 43 and 44 only add binary numbers. Consequently, after each addition the result is applied to the decimal adjust accumulator 85 through the D-bus 42 and the number which is generated by the decimal adjust accumulator 85 on the B-bus 41 is added to the result to convert it to BCD. This is represented in the TON.01 microroutine by the microinstructions A7=DAA+S7 and A6=DAA+S6. It should be apparent, therefore, that the decimal adjust accumulator enables the adjustment to be made with a single 200 nanosecond microinstruction. Although this saving in execution time is not substantial in the TON.01 microroutine, it does become significant when arithmetic functions are performed such as ADD, SUBTRACT, MULTIPLY and DIVIDE.

A microprogrammed programmable controller has been described which provides a number of advantages over prior programmable controllers. It should be apparent to those skilled in the art, however, that the address expansion provided by the ADX macroinstruction and the ten millisecond timer provided by the TON.01 macroinstruction could be embodied in other well known programmable controller structures. Consequently, reference is made to the following claims for a definition of the scope of the invention.

COMPONENT APPENDIX

| Reference No. | Manufacturer & Serial Number | Description |
|---|---|---|
| Memory 4 | Harris Semiconductor HM-6508 | 1K by 1 or 4K by 1 CMOS RAM's |
| UAR/T 12 | Advanced Micro devices AM9551DC | Programmable Communications Interface (USART) |
| UAR/T Data | Texas Instruments SN74LS244N | Octal Buffers/Line Drivers/ Line Receivers |
| I/O Address Gates 26 | Texas Instruments SN75452B | Dual Peripheral Positive-Nand Drivers |
| I/O Data Gates 33 | Advanced Micro devices AM2907PC | Quad Bus Transceiver |
| Micro- processor Slices 43 and 44 | Advanced Micro devices AM2901APC | 4-Bit Bipolar Microprocessor Slice |
| Data In Gates 45 | Texas Instruments SN74LS244N | Octal Buffers/Line Drivers/ Line Receivers |
| Data Out Latch 47 | Texas Instruments SN74S373N | Octal D-Type Latches |
| Address High Latch 50 | Texas Instruments SN74S373N | Octal D-Type Latches |
| Address Low Latch 51 | Texas Instruments SN74S373N | Octal D-Type Latches |
| Mapping PROM 55 | Texas Instruments SN74S471N SN74S287N | 256×8 PROM 256×4 1024 Bit PROM |
| Micro- program PROM 56 | Signetics N82S181N | 1K×8 Bipolar PROM |
| Micro- program Controller 60 | Advanced Micro devices AM2910DC | Microprogram Controller |
| Micro- instruction Register 61 | Texas Instruments SN74LS174N SN74LS175N | Hex D-Type Flip-Flops Quad D-Type Flip-Flops |
| Micro- jump Gates 67 | Texas Instruments SN74LS367N | Hex Bus Drivers |
| Immediate Gates 68 | Texas Instruments SN74LS244N | Octal Buffers/Line Drivers/ Line Receivers |
| Loop Gates 70 | Texas Instruments SN74LS367N | Hex Bus Drivers |
| Status Latch 79 | Texas Instruments SN74LS174N | Hex D-Type Flip-Flop |
| 8-Bit Status Selector 82 | Texas Instruments SN74LS151N | 1 of 8 Data Selectors/ Multiplexers |
| Decimal Adjust Accumulator 85 | Texas Instruments SN74S472N | 512×8 PROM |
| Bit Pointer Circuit 86 | Texas Instruments SN74S288N | 32×8 256 Bit PROM |
| Bit Pointer Code Latch 95 | Texas Instruments SN74LS175N | Quad D-Type Flip-Flops |
| Counter 105 | Texas Instruments SN74LS390N | Dual Decade Counters |
| 8-Bit Latch 106 | Texas Instruments SN74S374N | Octal D-Type Flip-Flops |

APPENDIX A

| Hexa-Decimal Address | Contents | | | | | | | | | | | | | | | |
|---|---|---|---|---|---|---|---|---|---|---|---|---|---|---|---|---|
| 0000 | 00 | 00 | 00 | 00 | 00 | 06 | 06 | 06 | 06 | 06 | 06 | 06 | 06 | 06 | 06 | 06 |
| 0010 | 00 | 00 | 00 | 00 | 00 | 06 | 06 | 06 | 06 | 06 | 06 | 06 | 06 | 06 | 06 | 06 |
| 0020 | 00 | 00 | 00 | 00 | 00 | 06 | 06 | 06 | 06 | 06 | 06 | 06 | 06 | 06 | 06 | 06 |
| 0030 | 00 | 00 | 00 | 00 | 00 | 06 | 06 | 06 | 06 | 06 | 06 | 06 | 06 | 06 | 06 | 06 |
| 0040 | 00 | 00 | 00 | 00 | 00 | 06 | 06 | 06 | 06 | 06 | 06 | 06 | 06 | 06 | 06 | 06 |

APPENDIX A-continued

| Hexa-Decimal Address | Contents | | | | | | | | | | | | | | | |
|---|---|---|---|---|---|---|---|---|---|---|---|---|---|---|---|---|
| 0050 | 00 | 00 | 00 | 00 | 00 | 06 | 06 | 06 | 06 | 06 | 06 | 06 | 06 | 06 | 06 | 06 |
| 0060 | 00 | 00 | 00 | 00 | 00 | 06 | 06 | 06 | 06 | 06 | 06 | 06 | 06 | 06 | 06 | 06 |
| 0070 | 00 | 00 | 00 | 00 | 00 | 06 | 06 | 06 | 06 | 06 | 06 | 06 | 06 | 06 | 06 | 06 |
| 0080 | 00 | 00 | 00 | 00 | 00 | 06 | 06 | 06 | 06 | 06 | 06 | 06 | 06 | 06 | 06 | 06 |
| 0090 | 00 | 00 | 00 | 00 | 00 | 66 | 66 | 06 | 06 | 06 | 06 | 06 | 06 | 66 | 66 | 66 |
| 00A0 | 60 | 60 | 60 | 60 | 60 | 66 | 66 | 66 | 66 | 66 | 66 | 66 | 66 | 66 | 66 | 66 |
| 00B0 | 60 | 60 | 60 | 60 | 60 | 66 | 66 | 66 | 66 | 66 | 66 | 66 | 66 | 66 | 66 | 66 |
| 00C0 | 60 | 60 | 60 | 60 | 60 | 66 | 66 | 66 | 66 | 66 | 66 | 66 | 66 | 66 | 66 | 66 |
| 00D0 | 60 | 60 | 60 | 60 | 60 | 66 | 66 | 66 | 66 | 66 | 66 | 66 | 66 | 66 | 66 | 66 |
| 00E0 | 60 | 60 | 60 | 60 | 60 | 66 | 66 | 66 | 66 | 66 | 66 | 66 | 66 | 66 | 66 | 66 |
| 00F0 | 60 | 60 | 60 | 60 | 60 | 66 | 66 | 66 | 66 | 66 | 66 | 66 | 66 | 66 | 66 | 66 |
| 0100 | 60 | 60 | 60 | 60 | 60 | 66 | 66 | 66 | 66 | 66 | 66 | 66 | 66 | 66 | 66 | 66 |
| 0110 | 60 | 60 | 60 | 60 | 60 | 66 | 66 | 66 | 66 | 66 | 66 | 66 | 66 | 66 | 66 | 66 |
| 0120 | 60 | 60 | 60 | 60 | 60 | 66 | 66 | 66 | 66 | 66 | 66 | 66 | 66 | 66 | 66 | 66 |
| 0130 | 60 | 60 | 60 | 60 | 60 | 66 | 66 | 66 | 66 | 66 | 66 | 66 | 66 | 66 | 66 | 66 |
| 0140 | 60 | 60 | 60 | 60 | 60 | 66 | 66 | 66 | 66 | 66 | 66 | 66 | 66 | 66 | 66 | 66 |
| 0150 | 60 | 60 | 60 | 60 | 60 | 66 | 66 | 66 | 66 | 66 | 66 | 66 | 66 | 66 | 66 | 66 |
| 0160 | 60 | 60 | 60 | 60 | 60 | 66 | 66 | 66 | 66 | 66 | 66 | 66 | 66 | 66 | 66 | 66 |
| 0170 | 60 | 60 | 60 | 60 | 60 | 66 | 66 | 66 | 66 | 66 | 66 | 66 | 66 | 66 | 66 | 66 |
| 0180 | 60 | 60 | 60 | 60 | 60 | 66 | 66 | 66 | 66 | 66 | 66 | 66 | 66 | 66 | 66 | 66 |
| 0190 | 60 | 60 | 60 | 60 | 60 | 66 | 66 | 66 | 66 | 66 | 66 | 66 | 66 | 66 | 66 | 66 |
| 01A0 | 60 | 60 | 60 | 60 | 60 | 66 | 66 | 66 | 66 | 66 | 66 | 66 | 66 | 66 | 66 | 66 |
| 01B0 | 60 | 60 | 60 | 60 | 60 | 66 | 66 | 66 | 66 | 66 | 66 | 66 | 66 | 66 | 66 | 66 |
| 01C0 | 60 | 60 | 60 | 60 | 60 | 66 | 66 | 66 | 66 | 66 | 66 | 66 | 66 | 66 | 66 | 66 |
| 01D0 | 60 | 60 | 60 | 60 | 60 | 66 | 66 | 66 | 66 | 66 | 66 | 66 | 66 | 66 | 66 | 66 |
| 01E0 | 60 | 60 | 60 | 60 | 60 | 66 | 66 | 66 | 66 | 66 | 66 | 66 | 66 | 66 | 66 | 66 |
| 01F0 | 60 | 60 | 60 | 60 | 60 | 66 | 66 | 66 | 66 | 66 | 66 | 66 | 66 | 66 | 66 | 66 |

We claim:

1. A programmable controller which comprises:
a random access memory which contains a control program comprised of a set of macroinstructions each stored on a separately addressable line of the memory;
an address bus coupled to said random access memory to select a line in said random access memory when an address signal is generated thereon;
a data bus coupled to said random access memory to receive data read from an addressed line of the random access memory and to write data into an addressed line of said random access memory;
a plurality of separately addressable sets of I/O interface circuits, each set being connected to a sensing device or operating device on a controlled machine;
I/O address gates having inputs connected to said address bus and outputs coupled to each of said separately addressable sets of I/O interface circuits;
I/O data gates connected to said data bus and coupled to each of said separately addressable sets of I/O circuits to read data from an addressed set or write data to an addressed set of I/O interface circuits; and
a controller processor which includes:
  (a) a microprogram read-only memory which stores sets of microinstructions that comprise microroutines;
  (b) microprogram addressing means coupled to said data bus and said microprogram read-only memory and being operable in response to a macroinstruction read from said random access memory to sequentially address macroinstructions in a microroutine;
  (c) a microinstruction register connected to receive the addressed microinstructions read from said microprogram read-only memory and generate the same on a microcode bus;
  (d) a central processor unit coupled to said data bus, coupled to said address bus and coupled to said microcode bus, said central processor unit being operable in response to microcodes on said microcode bus to perform arithmetic and logic operations on data received by it through said data bus, being operable in response to other microcodes on said microcode bus to generate address signals on said address bus, and being operable in response to other microcodes on said microcode bus to generate data on said data bus; and
  (e) a decimal adjust accumulator having inputs coupled to the central processor unit to receive binary numbers which result from arithmetic operations performed by said central processor unit, and having a set of outputs coupled to said central processor unit, said decimal adjust accumulator being operable to generate at its set of outputs a binary number which when added to the binary number applied to its inputs converts said binary number to a binary coded decimal number, whereby results of arithmetic functions performed using binary numbers can be quickly converted to binary coded decimal numbers.

2. The programmable controller as recited in claim 1 in which said decimal adjust accumulator is a read-only memory.

3. A programmable controller which comprises:
a memory for storing a control program comprised of a set of macroinstructions;
an address bus connected to said memory;
a first data bus connected to said memory;
data in gates having inputs connected to said first data bus and outputs connected to a second data bus;
data out gates having outputs connected to said first data bus and inputs connected to a third data bus;
address latch means having inputs connected to said third data bus and outputs connected to said address bus, said address latch means being operable to receive address data on said third data bus and apply the address data to the address bus;

mapping means having inputs connected to said second data bus and outputs connected to a microaddress bus, said mapping means being operable to convert macroinstruction operation codes appearing on said second data bus into a microroutine address;

a microprogram controller having inputs connected to said micro-address bus and set of outputs;

a microprogram read-only memory having address terminals connected to the outputs of said microprogram controller and having a set of output terminals, said microprogram read-only memory storing a plurality of microroutines, each comprised of a set of microinstructions;

a microinstruction register connected to the output terminals of said microprogram read-only memory and having a set of output terminals connected to a microcode bus;

a microprocessor slice having a set of control inputs connected to said microcode bus, having a set of data inputs connected to said second data bus and having a set of data output terminals connected to said third data bus; and interface means coupling said first data bus to a plurality of sets of I/O circuits that connect with sensing devices and operating devices on a controlled machine;

wherein the control program is periodically executed to control said machine by sequentially reading said macroinstructions out of said memory, mapping an operation code in each such macroinstruction into a starting address of an addressed microroutine stored in said microprogram read-only memory; and sequentially reading out the microinstructions in said addressed microroutine.

4. The programmable controller as recited in claim 3 in which a decimal adjust accumulator has inputs connected to said third data bus and outputs connected to said second data bus, said decimal adjust accumulator being responsive to a selected microinstruction read from said microprogram read-only memory to input a binary number generated on said third data bus and generate a binary number on said second data bus which when added to the binary number on the third data bus converts it to a BCD number.

5. A programmable controller which comprises:

a random access memory having n+m address input terminals where n and m are positive integers and a set of data terminals, said random access memory storing an I/O image and data table comprised of a base page portion stored on selectable memory lines and an extended portion stored on other selectable memory lines;

control program storage means for storing control instructions having an operation code that indicates a function to be performed and an n-bit operand address that indicates a selected line in said random access memory;

an address bus having n+m leads connected to respective ones of said n+m address input terminals on said random access memory;

a data bus having leads connected to said set of data terminals on said random access memory; and a controller processor which includes:

(a) address low storage means having outputs coupled to the n leads in said address bus for applying n-bit address data thereto;

(b) address high storage means having outputs coupled to the m leads in said address bus for applying m-bit address data thereto;

(c) means coupled to said control program storage means and being responsive to the execution of a control instruction to read the next control instruction from said control program storage means;

preset means coupled to said address high storage means for applying and storing in the address high storage means an m-bit base page address number;

means responsive to the operation code in a control instruction read from said control program storage means for storing its associated n-bit operand address in said address low storage means and reading a line of data from said I/O image and data table which is selected by the n+m bit address stored in said address high and address low storage means; and means responsive to a selected one operation code (ADX) in a control instruction read from said control program storage means for storing its associated n-bit operand address in said address high storage means and decoupling said preset means from said address high storage means;

wherein control instructions preceded by a control instruction containing said selected one operation code (ADX) may read data from the extended portion of said I/O image and data table and control instructions which are not preceded by a control instruction containing said selected one operation code (ADX) may read data from the base page portion of said I/O image and data table.

6. The programmable controller as recited in claim 5 in which n equals eight and m equals eight.

7. The programmable controller as recited in claim 5 in which said control program storage means forms part of said random access memory.

8. The programmable controller as recited in claim 5 in which said controller processor is a microprocessor which executes instructions stored in a read-only memory to carry out its functions.

9. The programmable controller as recited in claim 5 in which said data bus is coupled to a plurality of sets of I/O circuits that connect to a controlled machine and said address bus is coupled to each of said sets of I/O circuits, and in which data is periodically coupled through said data bus from selected lines of said I/O image and data table to each set of I/O circuits.

10. A programmable controller which comprises:

a memory for storing a control program which includes a timer instruction having an operation code and an operand address;

timer storage means associated with said timer instruction and located at said operand address for storing a preset number of time increments, for storing an accumulated number of time increments, for storing a clock count, and for storing a timed out bit;

a data bus coupled to said memory and said timer storage means;

a real time clock coupled to said data bus and including a counter which receives a clock signal and which generates a count indicative of the number of elapsed time increments; and a controller processor coupled to said data bus for executing the control program to operate a machine connected to the programmable controller, the controller processor including timer instruction execution means which is responsive to the operation code in the timer instruction and which includes:
- (a) means for calculating the difference count between the current real time clock count and the clock count in the associated time storage means;
- (b) means for storing the current real time clock count in said associated timer storage means;
- (c) means for adding the difference count to the accumulated number of time increments in the associated timer storage means;
- (d) means for comparing the accumulated number of time increments with the preset number of time increments in the associated timer storage means; and
- (e) means for setting the timed out bit in the associated timer storage means if the accumulated number of time increments is equal to or greater than the preset number of time increments.

11. The programmable controller as recited in claim 10 in which said controller processor includes a microprocessor which is operable to perform functions in response to microinstructions stored in a read-only memory and the controller processor responds to the operation code in said timer instruction by executing a timer microroutine stored in said read-only memory.

12. The programmable controller as recited in claim 10 in which there are a plurality of timer instructions contained in said control program, each having a different operand address, and there are a plurality of timer storage means one located at each of said different operand addresses.

13. The programmable controller as recited in claim 10 in which the memory for storing the control program and the timer storage means is a random access memory coupled to the controller processor by said data bus and an address bus.

14. The programmable controller as recited in claim 13 in which said random access memory stores an I/O image table, in which the address bus and data bus are coupled to I/O circuits that connect with sensing devices and operating devices on a controlled machine, and in which the controller processor is operable to periodically couple data between said I/O image table and said I/O circuits.

* * * * *